United States Patent
Takeuchi et al.

(10) Patent No.: US 11,909,046 B2
(45) Date of Patent: Feb. 20, 2024

(54) SYNTHETIC METHODS FOR CRYSTALLITE SIZE CONTROL OF BIMETALLIC POLYANIONIC BATTERY COMPOSITIONS

(71) Applicant: The Research Foundation for The State University of New York, Albany, NY (US)

(72) Inventors: Kenneth J. Takeuchi, South Setauket, NY (US); Esther S. Takeuchi, South Setauket, NY (US); Amy C. Marschilok, Stony Brook, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 524 days.

(21) Appl. No.: 15/914,192

(22) Filed: Mar. 7, 2018

(65) Prior Publication Data
US 2018/0261843 A1 Sep. 13, 2018

Related U.S. Application Data

(60) Provisional application No. 62/468,041, filed on Mar. 7, 2017.

(51) Int. Cl.
*H01M 4/58* (2010.01)
*C01B 25/45* (2006.01)
(Continued)

(52) U.S. Cl.
CPC .......... *H01M 4/5825* (2013.01); *C01B 25/45* (2013.01); *H01M 10/0525* (2013.01);
(Continued)

(58) Field of Classification Search
CPC .......... H01M 4/5825; H01M 10/0525; H01M 2004/028; C01B 25/45; C01P 2002/72;
(Continued)

(56) References Cited

U.S. PATENT DOCUMENTS

| 4,835,126 A | 5/1989 | Wachs et al. |
| 4,855,457 A | 8/1989 | Ramzi et al. |

(Continued)

FOREIGN PATENT DOCUMENTS

| CN | 106622315 A | 5/2017 |
| CN | 107111197 A | 8/2017 |

(Continued)

OTHER PUBLICATIONS

Huang et al., "Microwave-Assisted Synthesis of Silver Vanadium Phosphorus Oxide," AgChem. Mater. 2016, 28, 7, 2191-2199 Publication Date:Mar. 7, 2016 https://doi.org/10.1021/acs.chemmater.6b00124 (Year: 2016).*

(Continued)

*Primary Examiner* — Steven J Bos
*Assistant Examiner* — Syed T Iqbal
(74) *Attorney, Agent, or Firm* — Scully, Scott, Murphy & Presser, P.C.

(57) ABSTRACT

Bimetallic polyanionic materials, such as silver vanadium phosphorus oxide ($Ag_2VO_2PO_4$, SVOP), are promising cathode materials for Li batteries due in part to their large capacity and high current capability. A new synthesis of $Ag_2VO_2PO_4$ based on microwave heating is disclosed, where the reaction time is reduced by approximately 100 times relative to other reported methods, and the crystallite size is controlled via synthesis temperature, showing a linear positive correlation of crystallite size with temperature. Reaction times of an hour or less are sufficient to render phase-pure material after reaction at 50° C. to 180° C., significantly lower than the temperatures reported for other methods. Crystallite sizes between 42 nm and 60 nm are achieved by the novel method, smaller than by other methods. Silver/vanadium atomic ratios of 1.96 to 2.04 in the as-synthesized SVOP result and appear temperature-depen- (Continued)

dent. Notably, under galvanostatic reduction, the $Ag_2VO_2PO_4$ sample with the smallest crystallite size delivers the highest capacity and shows the highest loaded voltage.

13 Claims, 18 Drawing Sheets

(51) Int. Cl.
*H01M 10/0525* (2010.01)
*H01M 4/02* (2006.01)

(52) U.S. Cl.
CPC ...... *C01P 2002/60* (2013.01); *C01P 2002/72* (2013.01); *C01P 2002/77* (2013.01); *C01P 2002/82* (2013.01); *C01P 2002/88* (2013.01); *C01P 2004/03* (2013.01); *C01P 2006/40* (2013.01); *H01M 2004/028* (2013.01)

(58) Field of Classification Search
CPC .............. C01P 2004/03; C01P 2002/77; C01P 2002/82; C01P 2002/88; C01P 2002/60; C01P 2006/40

See application file for complete search history.

(56) References Cited

U.S. PATENT DOCUMENTS

| | | | |
|---|---|---|---|
| 4,931,572 | A | 6/1990 | Saleh et al. |
| 4,943,424 | A | 7/1990 | Miller |
| 5,087,347 | A | 2/1992 | Miller |
| 5,158,665 | A | 10/1992 | Miller |
| 5,208,005 | A | 5/1993 | Miller |
| 5,540,981 | A | 7/1996 | Gallagher et al. |
| 6,232,264 | B1 | 5/2001 | Lukehart et al. |
| 6,436,167 | B1 | 8/2002 | Chow et al. |
| 6,528,033 | B1 | 3/2003 | Barker et al. |
| 6,660,681 | B1 | 12/2003 | Ledoux et al. |
| 6,710,011 | B2 | 3/2004 | Mamedov et al. |
| 6,716,372 | B2 | 4/2004 | Barker et al. |
| 6,884,544 | B2 | 4/2005 | Barker et al. |
| 7,009,075 | B2 | 3/2006 | Hazin |
| 7,390,920 | B2 | 6/2008 | Coleman et al. |
| 7,575,699 | B2 | 8/2009 | Strouse et al. |
| 7,591,942 | B2 | 9/2009 | Soled et al. |
| 7,615,169 | B2 | 11/2009 | Strouse et al. |
| 7,981,275 | B2 | 7/2011 | Toledo Antonio et al. |
| 8,067,331 | B2 | 11/2011 | Eijsbouts-Spickova et al. |
| 8,198,479 | B2 | 6/2012 | Arhancet et al. |
| 8,298,981 | B2 | 10/2012 | Taufiq-Yap et al. |
| 8,313,719 | B2 | 11/2012 | Barker et al. |
| 8,431,506 | B2 | 4/2013 | Neltner et al. |
| 8,617,502 | B2 | 12/2013 | Augustine et al. |
| 8,703,639 | B2 | 4/2014 | Wan et al. |
| 8,722,563 | B2 | 5/2014 | Soled et al. |
| 8,722,564 | B2 | 5/2014 | Soled et al. |
| 8,765,629 | B2 | 7/2014 | Norman et al. |
| 8,808,576 | B2 | 8/2014 | Hibst et al. |
| 8,993,801 | B2 | 3/2015 | Boppana et al. |
| 9,120,081 | B2 | 9/2015 | Liu et al. |
| 9,192,921 | B1 | 11/2015 | Jothimurugesan et al. |
| 9,321,973 | B2 | 4/2016 | Marchand et al. |
| 9,493,390 | B2 | 11/2016 | Boppana et al. |
| 9,573,119 | B2 | 2/2017 | Deng et al. |
| 10,050,271 | B2 | 8/2018 | Barker et al. |
| 2003/0144539 | A1 | 7/2003 | Mamedov et al. |
| 2004/0016632 | A1 | 1/2004 | Barker |
| 2004/0262571 | A1 | 12/2004 | Barker et al. |
| 2005/0238961 | A1 | 10/2005 | Barker et al. |
| 2006/0004228 | A1 | 1/2006 | Hazin |
| 2006/0060998 | A1 | 3/2006 | Strouse et al. |
| 2006/0061017 | A1 | 3/2006 | Strouse et al. |
| 2006/0229466 | A1 | 10/2006 | Arhancet et al. |
| 2007/0286796 | A1 | 12/2007 | Koper et al. |
| 2009/0192030 | A1 | 7/2009 | Myers et al. |
| 2010/0029998 | A1 | 2/2010 | Miller |
| 2010/0087663 | A1 | 4/2010 | Hibst et al. |
| 2010/0311574 | A1 | 12/2010 | Taufiq-Yap et al. |
| 2011/0031105 | A1 | 2/2011 | Miyanaga |
| 2011/0052986 | A1 | 3/2011 | Barker et al. |
| 2011/0085958 | A1 | 4/2011 | Swoyer et al. |
| 2012/0071671 | A1 | 3/2012 | Karpov et al. |
| 2013/0123517 | A1* | 5/2013 | Karpov ............... C07D 307/60 502/209 |
| 2014/0018550 | A1 | 1/2014 | Michael et al. |
| 2014/0027346 | A1 | 1/2014 | Chaumonnot et al. |
| 2014/0212694 | A1 | 7/2014 | Park et al. |
| 2014/0374319 | A1 | 12/2014 | Soled et al. |
| 2015/0303474 | A1 | 10/2015 | Barker et al. |
| 2018/0261843 | A1 | 9/2018 | Takeuchi et al. |
| 2021/0107835 | A1 | 4/2021 | Ansari et al. |
| 2021/0371297 | A1 | 12/2021 | Perkins et al. |
| 2023/0170466 | A1 | 6/2023 | Yushin et al. |

FOREIGN PATENT DOCUMENTS

| | | |
|---|---|---|
| EP | 2520387 B1 | 6/2017 |
| EP | 2654947 B1 | 8/2019 |
| KR | 20190018652 A | 2/2019 |
| WO | 2022038508 A1 | 2/2022 |

OTHER PUBLICATIONS

Kim et al., "Silver vanadium phosphorous oxide, Ag2VO2PO", Journal of Power Sources, vol. 196, Issue 16, Aug. 15, 2011, pp. 6781-6787. (Year: 2011).*

Muthuswamy, E., et al., "Facile Synthesis of Germanium Nanoparticles with Size Control: Microwave versus Conventional Heating," Chem. Mater., 25, 1416-1422 (2013).

Harrison, K. L., et al., "Microwave-Assisted Solvothermal Synthesis and Characterization of Various Polymorphs of LiVOPO4," Chem. Mater., 25, 1751-1760 (2013).

Higuchi, M., et al., "Synthesis of LiFePO4 cathode material by microwave processing," J. Power Sources, 119-121, 258-261 (2003).

Muraliganth, T., et al., "Nanoscale networking of LiFePO4 nanorods synthesized by a microwave-solvothermal route with carbon nanotubes for lithium ion batteries," J. Mater. Chem., 18, 5661-5668 (2008).

Chen, K., et al., "Microwave-Hydrothermal Crystallization of Polymorphic MnO2 for Electrochemical Energy Storage," J. Phys. Chem. C, 117, 10770-10779 (2013).

Beninati, S., et al., "MW-assisted synthesis of SVO for ICD primary batteries," J. Power Sources, 157, 483-487 (2006).

Yang, G., et al., "Temperature-controlled microwave solid-state synthesis of Li3V2(PO4)3 as cathode materials for lithium batteries," J. Power Sources, 195, 5374-5378 (2010).

Kang, H.-Y., et al., "Hydrothermal synthesis, crystal structure and ionic conductivity of Ag2VO2PO4: a new layered phosphate of vanadium(V)," J. Chem. Soc., Dalton Trans., 1525-1528 (1993).

Toby, B. H., et al., "GSAS-II: the genesis of a modern open-source all purpose crystallography software package," J. Appl. Crystallogr., 46, 544-549 (2013).

Scherrer, P., "Estimation of the size and internal structure of colloidal particles by means of Röntgen rays," Nachr. Ges. Wiss. Gottingen, 96-100 (1918) ["P. Scherrer 1918"].

Baddour-Hadjean, R., et al., "Raman Microspectrometry Study of Electrochemical Lithium Intercalation into Sputtered Crystalline V2O5 Thin Films," Chem. Mater., 20, 1916-1923 (2008).

Lee, S.-H., et al., "Microstructure study of amorphous vanadium oxide thin films using raman spectroscopy," J. Appl. Phys., 92, 1893 (2002).

Horrocks, G. A., et al., "Finite size effects on the structural progression induced by lithiation of V2O5: a combined diffraction and Raman spectroscopy study," J. Mater. Chem. A, 1, 15265-15277 (2013).

Huang, J., et al., "Microwave-Assisted Synthesis of Silver Vanadium Phosphorus Oxide, Ag2VO2PO4: Crystallite Size Control and Impact on Electrochemistry," Chem. Mater., 28, 2191-2199 (2016) with Supplementary Information.

(56) References Cited

OTHER PUBLICATIONS

Armand, M., et al., "Building better batteries," Nature, 451, 652-657 (2008).
Melot, B. C., et al., "Design and Preparation of Materials for Advanced Electrochemical Storage," Acc. Chem. Res., 46, 1226-1238 (2013).
Goodenough, J. B., et al., "The Li-Ion Rechargeable Battery: A Perspective," J. Am. Chem. Soc., 135, 1167-1176 (2013).
Amine, K., et al., "Rechargeable lithium batteries and beyond: Progress, challenges, and future directions,". MRS Bull., 39, 395-401 (2014).
Padhi, A. K., et al., "Phospho-olivines as Positive-Electrode Materials for Rechargeable Lithium Batteries," J. Electrochem. Soc., 144, 1188-1194 (1997).
Amine, K., et al., "Olivine LiCoPO4 as 4.8 V Electrode Material for Lithium Batteries," Electrochem. Solid-State Lett., 3, 178-179 (2000).
Li, G., et al., "LiMnPO4 as the Cathode for Lithium Batteries," Electrochem. Solid-State Lett., 5, A135-A137 (2002).
Koltypin, M., et al., "On the Stability of LiFePO4 Olivine Cathodes under Various Conditions (Electrolyte Solutions, Temperatures)," Electrochem. Solid-State Lett., 10, A40-A44 (2007).
MacNeil, D. D., et al., "A comparison of the electrode/electrolyte reaction at elevated temperatures for various Li-ion battery cathodes," J. Power Sources, 108, 8-14 (2002).
Yamada, A., et al., "Olivine-type cathodes, achievements and problems" J. Power Sources, 119-121, 232-238 (2003).
Delacourt, C., et al., "Size Effects on Carbon-Free LiFePO4 Powders: The Key to Superior Energy Density," Electrochem. Solid-State Lett., 9, A352-A355 (2006).
Sun, C., et al. "Monodisperse Porous LiFePO4 Microspheres for a High Power Li-Ion Battery Cathode," J. Am. Chem. Soc., 133, 2132-2135 (2011).
Ravet, N., et al., Electroactivity of natural and synthetic triphylite. J. Power Sources, 97-98, 503-507 (2001).
Qin, G., et al., "C/LiFePO4/multi-walled carbon nanotube cathode material with enhanced electro-chemical performance for lithium-ion batteries," J. Power Sources, 248, 588-595 (2014).
Chung, S.-Y., et al., "Electronically conductive phospho-olivines as lithium storage electrodes," Nat. Mater., 1, 123-128 (2002).
Harrison, K. L., et al., "A. Temperature Dependence of Aliovalent-Vanadium Doping in LiFePO4 Cathodes," Chem. Mater., 25, 768-781 (2013).
Marschilok, A. C., et al., "Preparation and Electrochemistry of Silver Vanadium Phosphorous Oxide, Ag2VO2PO4," Electrochem. Solid-State Lett., 12, A5-A9 (2009).
Takeuchi, E. S., et al., "Electrochemical Reduction of Silver Vanadium Phosphorus Oxide, Ag2VO2PO4: The Formation of Electrically Conductive Metallic Silver Nanoparticles," Chem. Mater., 21, 4934-4939 (2009).
Marschilok, A. C., et al., "Electrochemical reduction of silver vanadium phosphorous oxide, Ag2VO2PO4: Silver metal deposition and associated increase in electrical conductivity," J. Power Sources, 195, 6839-6846 (2010).
Patridge, C. J., et al., "An X-ray Absorption Spectroscopy Study of the Cathodic Discharge of Ag2VO2PO4: Geometric and Electronic Structure Characterization of Intermediate phases and Mechanistic Insights," J. Phys. Chem. C, 115, 14437-14447 (2011).
Kim, Y. J., et al., "AgxVOPO4: A demonstration of the dependence of battery-related electrochemical properties of silver vanadium phosphorous oxides on Ag/V ratios," J. Power Sources, 196, 3325-3330 (2011).
Marschilok, A. C., et al., "Silver Vanadium Phosphorous Oxide, Ag0.48VOPO4: Exploration as a Cathode Material in Primary and Secondary Battery Applications," J. Electrochem. Soc., 159, A1690-A1695 (2012).
Kirshenbaum, K., et al., "In situ visualization of Li/ Ag2VP2O8 batteries revealing rate-dependent discharge mechanism," Science, 347, 149-154 (2015).
Kirshenbaum, K. C., et al., "In situ profiling of lithium/ Ag2VP2O8 primary batteries using energy dispersive X-ray diffraction," Phys. Chem. Chem. Phys., 16, 9138-9147 (2014).
Kim, Y. J., et al., "Ag3.2VP1.5O7.8: A High Voltage Silver Vanadium Phosphate Cathode Material," J. Electrochem. Soc., 160, A2207-A2211 (2013).
Leising, R. A., et al., "Solid-State Synthesis and Characterization of Silver Vanadium Oxide for Use as a Cathode Material for Lithium Batteries," Chem. Mater., 6, 489-495 (1994).
Takeuchi, K. J., et al. "Advanced lithium batteries for implantable medical devices: mechanistic study of SVO cathode synthesis," J. Power Sources, 119-121, 973-978 (2003).
Cao, X., et al., "Improvement of LiCoO(2) cathodes by using Ag(2)V(4)O(11) as an additive," Mater. Sci.-Pol., 27, 287-295 (2009).
Sauvage, F., et al., "Ag4V2O6F2 (SVOF): A high silver density phase and potential new cathode material for implantable cardioverter defibrillators," Inorg. Chem., 47, 8464-8472 (2008).
Sauvage, F., et al., "Ag6Mo2O7F3Cl: A New Silver Cathode Material for Enhanced ICD Primary Lithium Batteries," Inorg. Chem., 49, 6461-6467 (2010).
Farley, K. E., et al., "Synthesis and Electrochemistry of Silver Ferrite," Electrochem. Solid-State Lett., 15, A23-A27 (2010).
Morcrette, M., et al., "A reversible copper extrusion-insertion electrode for rechargeable Li batteries," Nat. Mater., 2, 755-761 (2003).
Kirshenbaum, K. C., et al., "Electrochemical reduction of Ag2VP2O8 composite electrodes visualized via in situ energy dispersive X-ray diffraction (EDXRD): unexpected conductive additive effects," J. Mater. Chem. A, 3, 18027-18035 (2015).
Takeuchi, K. J., et al., "Silver vanadium oxides and related battery applications," Coord. Chem. Rev., 219-221, 283-310 (2001).
Bock, D. C., et al., "Batteries used to power implantable biomedical devices," Electrochim. Acta, 84, 155-164 (2012).
Bock, D. C., et al., "A kinetics and equilibrium study of vanadium dissolution from vanadium oxides and phosphates in battery electrolytes: Possible impacts on ICD battery performance," J. Power Sources, 231, 219-225 (2013).
Bock, D. C., et al., "Silver vanadium oxide and silver vanadium phosphorous oxide dissolution kinetics: a mechanistic study with possible impact on future ICD battery lifetimes," Dalton Trans., 42, 13981-13989 (2013).
Sauvage, F., et al., "Room-Temperature Synthesis Leading to Nanocrystalline Ag2V4O11," J. Am. Chem. Soc., 132, 6778-6782 (2010).
Friedrich, M., et al., "Crystallite Size Controls the Crystal Structure of Cu60Pd40 Nanoparticles," Chem. Mater., 21, 5886-5891 (2009).
Becker, J., et al., "Tuning of the Crystallite and Particle Sizes of ZnO Nanocrystalline Materials in Solvothermal Synthesis and Their Photocatalytic Activity for Dye Degradation," J. Phys. Chem. C, 115, 13844-13850 (2011).
Takeuchi, K. J., et al., "Synthetic Control of Composition and Crystallite Size of Silver Hollandite, AgxMn8O16: Impact on Electrochemistry," ACS Appl. Mater. Interfaces, 4, 5547-5554 (2012).
Takeuchi, K. J., et al., "The Electrochemistry of Silver Hollandite Nanorods, AgxMn8O16: Enhancement of Electrochemical Battery Performance via Dimensional and Compositional Control," J. Electrochem. Soc., 160, A3090-A3094 (2013).
Okubo, M., et al., "Fast Li-Ion Insertion into Nanosized LiMn2O4 without Domain Boundaries," ACS Nano, 4, 741-752 (2010).
Zhu, S., et al., "Nanocrystalline Magnetite: Synthetic Crystallite Size Control and Resulting Magnetic and Electrochemical Properties," J. Electrochem. Soc., 157, A1158-A1163 (2010).
Shen, Y., et al., "Controlling Size, Crystallinity, and Electrochemical Performance of Li4Ti5O12 Nano-crystals," Chem. Mater., 25, 5023-5030 (2013).
Zhu, S., et al., "Crystallite Size Control and Resulting Electrochemistry of Magnetite, Fe3O4," Electrochem. Solid-State Lett., 12, A91-A94 (2009).
Kim, Y. J., et al., "Silver vanadium phosphorous oxide, Ag2VO2PO4: Chimie douce preparation and resulting lithium cell electrochemistry," J Power Sources, 196, 6781-6787 (2011).

(56) References Cited

OTHER PUBLICATIONS

Kitchen, H. J., et al., "Modern Microwave Methods in Solid-State Inorganic Materials Chemistry: From Fundamentals to Manufacturing," Chem. Rev., 114, 1170-1206 (2014).

Zhu, Y.-J., et al., "Microwave-Assisted Preparation of Inorganic Nanostructures in Liquid Phase," Chem. Rev., 114, 6462-6555 (2014).

Collins, M. J., Jr., "Future trends in microwave synthesis," Future Med. Chem., 2, 151-155 (2010).

Takeuchi, E. S., et al., "Electrochemical Reduction of Silver Vanadium Phosphorus Oxide, Ag2VO2PO4: The Formation of Electrically Conductive Metallic Silver Nanoparticles", Chem. Mater. 2009, pp. 4934-4939, 21.

* cited by examiner

SYNTHETIC METHODS FOR CRYSTALLITE SIZE CONTROL OF BIMETALLIC POLYANIONIC BATTERY COMPOSITIONS

CROSS-REFERENCE TO RELATED APPLICATIONS

This application claims priority to U.S. Provisional Patent Application No. 62/468,041, filed 7 Mar. 2017, which is incorporated by reference in its entirety.

STATEMENT OF GOVERNMENT RIGHTS

This invention was made with government support under DESC0012673 awarded by the United States Department of Energy. The government has certain rights in the invention.

FIELD OF THE INVENTION

This invention relates to cathode materials for secondary Li-ion battery applications, and in particular to methods of making them rapidly and with controlled crystallite size.

BACKGROUND

Key issues associated with the development of cathode materials for secondary Li-ion battery applications continue to be high voltage, large discharge capacity, high power output, and long-term cycle stability. (See, e.g., Armand, M., et al., "Building better batteries," Nature, 451, 652-657 (2008); Melot, B. C., et al., "Design and Preparation of Materials for Advanced Electrochemical Storage," Acc. Chem. Res., 46, 1226-1238 (2013); Goodenough, J. B., et al., "The Li-Ion Rechargeable Battery: A Perspective," J. Am. Chem. Soc., 135, 1167-1176 (2013); and Amine, K., et al., "Rechargeable lithium batteries and beyond: Progress, challenges, and future directions,". MRS Bull., 39, 395-401 (2014), each of which is incorporated by reference in its entirety.)

Further, lithium transition metal phosphates, generally described as $LiMPO_4$ (M equals Fe, Mn, Co, etc.), are appealing due to their high chemical and thermal stability. (See, e.g., Padhi, A. K., et al., "Phospho-olivines as Positive-Electrode Materials for Rechargeable Lithium Batteries," J. Electrochem. Soc., 144, 1188-1194 (1997) ["Padhi 1997"]; Amine, K., et al., "Olivine $LiCoPO_4$ as 4.8 V Electrode Material for Lithium Batteries," Electrochem. Solid-State Lett., 3, 178-179 (2000); Li, G., et al., "$LiMnPO_4$ as the Cathode for Lithium Batteries," Electrochem. Solid-State Lett., 5, A135-A137 (2002); Koltypin, M., et al., "On the Stability of $LiFePO_4$ Olivine Cathodes under Various Conditions (Electrolyte Solutions, Temperatures)," Electrochem. Solid-State Lett., 10, A40-A44 (2007); and MacNeil, D. D., et al., "A comparison of the electrode/electrolyte reaction at elevated temperatures for various Li- ion battery cathodes," J. Power Sources, 108, 8-14 (2002), each of which is incorporated by reference in its entirety.) By introducing the $PO^{3-}$ polyanion into the crystal structure, an enhanced stabilization is observed.

Additionally, due to a stronger polarizing effect of $P^{5+}$ on O relative to the polarizing effect of $M^{2+}$ on $O^{2-}$, the potential of the $M^{3+}/M^{2+}$ redox couple is reduced with phosphates relative to oxides, resulting in an increase in the open circuit voltage as well as the operating voltage (Padhi 1997). Based on this "inductive effect," the voltages for $Fe^{3+}/Fe^{2+}$, $Mn^{3+}/Mn^{2+}$, and $Co^{3+}/Co^{2+}$ couples in the $LiMPO_4$ compounds are 3.4, 4.1, and 4.8 V (versus Li), respectively. (See, e.g., Yamada, A., et al., "Olivine-type cathodes, achievements and problems" J. Power Sources, 119-121, 232-238 (2003) ["Yamada 2003"], which is incorporated by reference in its entirety.) However, the poor electrical conductivities and low volumetric capacities associated with phosphate materials mitigate the possible advantages in Li-ion batteries (Yamada 2003).

Specifically, to overcome the inherently low electrical conductivity of $LiMPO_4$, several strategies have been proposed in recent years, such as controlling the particle size, carbon coating, and metal doping. (See, e.g., Delacourt, C., et al., "Size Effects on Carbon-Free $LiFePO_4$ Powders: The Key to Superior Energy Density," Electrochem. Solid-State Lett., 9, A352-A355 (2006); Sun, C., et al. "Monodisperse Porous $LiFePO_4$ Microspheres for a High Power Li– Ion Battery Cathode," J. Am. Chem. Soc., 133, 2132-2135 (2011); Ravet, N., et al., "Electroactivity of natural and synthetic triphylite. J. Power Sources, 97-98, 503-507 (2001); Qin, G., et al., "C/$LiFePO_4$/multi-walled carbon nanotube cathode material with enhanced electro-chemical performance for lithium-ion batteries," J. Power Sources, 248, 588-595 (2014); Chung, S.-Y., et al., "Electronically conductive phospho-olivines as lithium storage electrodes," Nat. Mater., 1, 123-128 (2002); and Harrison, K. L., et al., "A. Temperature Dependence of Aliovalent-Vanadium Doping in $LiFePO_4$ Cathodes," Chem. Mater., 25, 768-781 (2013), each of which is incorporated by reference in its entirety.)

In previously published works, the inventors have established a paradigm for increasing the conductivity of polyanionic cathode materials through the use of bimetallic materials where one of the metal centers can be reduced in situ through a reduction-displacement reaction to form a conductive metallic network. (See, e.g., Marschilok, A. C., et al., "Preparation and Electrochemistry of Silver Vanadium Phosphorous Oxide, $Ag_2VO_2PO_4$," Electrochem. Solid-State Lett., 12, A5-A9 (2009) ["A. C. Marschilok 2009"]; and Takeuchi, E. S., et al., "Electrochemical Reduction of Silver Vanadium Phosphorus Oxide, $Ag_2VO_2PO_4$: The Formation of Electrically Conductive Metallic Silver Nanoparticles," Chem. Mater., 21, 4934-4939 (2009) ["E. S. Takeuchi 2009"], each of which is incorporated by reference in its entirety.)

The inventors and others have explored a family of materials described as $Ag_wV_xO_yPO_z$ including: $Ag_2VO_2PO_4$ (see, e.g., E. S. Takeuchi 2009; Marschilok, A. C., et al., "Electrochemical reduction of silver vanadium phosphorous oxide, $Ag_2VO_2PO_4$: Silver metal deposition and associated increase in electrical conductivity," J. Power Sources, 195, 6839-6846 (2010); and Patridge, C. J., et al., "An X-ray Absorption Spectroscopy Study of the Cathodic Discharge of $Ag_2VO_2PO_4$: Geometric and Electronic Structure Characterization of Intermediate phases and Mechanistic Insights," J. Phys. Chem. C, 115, 14437-14447 (2011), each of which is incorporated by reference in its entirety);

$Ag_{0.48}VOPO_4 \cdot 1.9H_2O$ (see, e.g., Kim, Y. J., et al., "$Ag_xVOPO_4$: A demonstration of the dependence of battery-related electrochemical properties of silver vanadium phosphorous oxides on Ag/V ratios," J. Power Sources, 196, 3325-3330 (2011) ["Y. J. Kim 2011"]; and Marschilok, A. C., et al., "Silver Vanadium Phosphorous Oxide, $Ag_{0.48}VOPO_4$: Exploration as a Cathode Material in Primary and Secondary Battery Applications," J. Electrochem. Soc., 159, A1690-A1695 (2012), each of which is incorporated by reference in its entirety);

$Ag_2VP_2O_8$ (see, e.g. Kirshenbaum, K., et al., "In situ visualization of Li/$Ag_2VP_2O_8$ batteries revealing rate-dependent discharge mechanism," *Science,* 347, 149-154 (2015) ["K. Kirshenbaum 2015"]; and Kirshenbaum, K. C., et al., "In situ profiling of lithium/$Ag_2VP_2O_8$ primary batteries using energy dispersive X-ray diffraction," *Phys. Chem. Chem. Phys.,* 16, 9138-9147 (2014), each of which is incorporated by reference in its entirety); and $Ag_{3.2}VP_{1.5}O_{7.8}$ (see, e.g., Kim, Y. J., et al., "$Ag_{3.2}VP_{1.5}O_{7.8}$: A High Voltage Silver Vanadium Phosphate Cathode Material," *J. Electrochem. Soc.,* 160, A2207-A2211 (2013), which is incorporated by reference in its entirety).

Several other oxide and polyanion framework materials present the opportunity for enhanced conductivity due to in situ metal formation on electrochemical reduction, including:

$Ag_2V_4O_{11}$ (see, e.g., Leising, R. A., et al., "Solid-State Synthesis and Characterization of Silver Vanadium Oxide for Use as a Cathode Material for Lithium Batteries," *Chem. Mater.,* 6, 489-495 (1994); Takeuchi, K. J., et al. "Advanced lithium batteries for implantable medical devices: mechanistic study of SVO cathode synthesis," *J. Power Sources,* 119-121, 973-978 (2003) ["K. J. Takeuchi 2003"]; and Cao, X., et al., "Improvement of LiCoO(2) cathodes by using Ag(2)V(4)O(11) as an additive," *Mater. Sci.-Pol.,* 27, 287-295 (2009), each of which is incorporated by reference in its entirety);

$Ag_4V_2O_6F_2$ (see, e.g., Sauvage, F., et al., "Ag4V2O6F2 (SVOF): A high silver density phase and potential new cathode material for implantable cardioverter defibrillators," *Inorg. Chem.,* 47, 8464-8472 (2008), which is incorporated by reference in its entirety);

$Ag_6Mo_2O_7F_3Cl$ (see, e.g., Sauvage, F., et al., "Ag6Mo2O7F3Cl: A New Silver Cathode Material for Enhanced ICD Primary Lithium Batteries," *Inorg. Chem.,* 49, 6461-6467 (2010), which is incorporated by reference in its entirety);

$AgFeO_2$ (see, e.g., Farley, K. E., et al., "Synthesis and Electrochemistry of Silver Ferrite," *Electrochem. Solid-State Lett.,* 15, A23-A27 (2010), which is incorporated by reference in its entirety); $Cu_{2.33}V_4O_{11}$ (see, e.g., Morcrette, M., et al., "A reversible copper extrusion-insertion electrode for rechargeable Li batteries," *Nat. Mater.,* 2, 755-761 (2003), which is incorporated by reference in its entirety); and $Cu_{0.5}VOPO_4 \cdot 2H_2O$ (see, e.g., Kirshenbaum, K. C., et al., "Electrochemical reduction of Ag2VP2O8 composite electrodes visualized via in situ energy dispersive X-ray diffraction (EDXRD): unexpected conductive additive effects," *J. Mater. Chem. A,* 3, 18027-18035 (2015), which is incorporated by reference in its entirety). This strategy should continue to lead to a variety of future battery materials, especially for high power applications.

Silver vanadium phosphorus oxide ($Ag_2VO_2PO_4$, SVOP) can provide 270 mAh/g from the reduction of $Ag^+$ to Ag metal and $V^{5+}$ to $V^{4+}$ or $V^{3+}$. Notably, in situ formation of conductive silver nanoparticles during the initial reduction process decreases the impedance of Li/$Ag_2VO_2PO_4$ batteries by 15,000-fold, resulting in high current capability throughout the cell lifetime (E. S. Takeuchi 2009). The silver formation in $Ag_2VO_2PO_4$ is highly rate dependent, where the use of lower current densities early in the discharge of a multifunctional bimetallic cathode-containing cell results in metallic silver formation that is more evenly distributed, resulting in the opportunity for more complete cathode use and higher functional capacity (K. Kirshenbaum 2015).

Compared to silver vanadium oxide ($Ag_2V_4O_{11}$, SVO), which has been successfully deployed for Li/SVO batteries used to power implantable cardioverter defibrillators (ICD) (see, e.g., K. J. Takeuchi 2003; Takeuchi, K. J., et al., "Silver vanadium oxides and related battery applications," *Coord. Chem. Rev.,* 219-221, 283-310 (2001); and Bock, D. C., et al., "Batteries used to power implantable biomedical devices," *Electrochim. Acta,* 84, 155-164 (2012), each of which is incorporated by reference in its entirety), silver vanadium phosphorus oxide (SVOP) exhibits reduced cathode solubility in Li/SVOP cells, likely due to $PO^{3-}$ (see, e.g., Bock, D. C., et al., "A kinetics and equilibrium study of vanadium dissolution from vanadium oxides and phosphates in battery electrolytes: Possible impacts on ICD battery performance," *J. Power Sources,* 231, 219-225 (2013); and Bock, D. C., et al., "Silver vanadium oxide and silver vanadium phosphorous oxide dissolution kinetics: a mechanistic study with possible impact on future ICD battery lifetimes," *Dalton Trans.,* 42, 13981-13989 (2013), each of which is incorporated by reference in its entirety).

Additionally, nanocrystalline SVO is reported to show new electrochemical features relative to microcrystalline SVO (see, e.g., Sauvage, F., et al., "Room-Temperature Synthesis Leading to Nanocrystalline Ag2V4O11," *J. Am. Chem. Soc.,* 132, 6778-6782 (2010), which is incorporated by reference in its entirety). For example, nanocrystalline SVO exhibits a quasi-reversible silver displacement reaction, where the reduction potential of silver ion is higher than that of microcrystalline SVO. Reversible capacity (~100 mAh/g) can be maintained for over 30 cycles at a 2C rate when the cell is cycled between 3.8 V and 2.3 V. In larger voltage windows, more than 300 mAh/g is delivered with gradual capacity decline, attributed to a lack of reversibility of $V^{5+}/V^{3+}$ redox couple by Sauvage, et al. After 30 cycles, the materials are still able to provide a capacity exceeding 120 mAh/g.

In general, material crystallite size has been reported to play an important role in affecting physical, chemical, and functional properties, such as catalytic activity, photocatalytic properties, and electrochemical performance. (See, e.g., Friedrich, M., et al., "Crystallite Size Controls the Crystal Structure of Cu60Pd40 Nanoparticles," *Chem. Mater.,* 21, 5886-5891 (2009); Becker, J., et al., "Tuning of the Crystallite and Particle Sizes of ZnO Nanocrystalline Materials in Solvothermal Synthesis and Their Photocatalytic Activity for Dye Degradation," *J. Phys. Chem. C,* 115, 13844-13850 (2011); Takeuchi, K. J., et al., "Synthetic Control of Composition and Crystallite Size of Silver Hollandite, AgxMn8O16: Impact on Electrochemistry," *ACS Appl. Mater. Interfaces,* 4, 5547-5554 (2012) ["K. J. Takeuchi 2012"]; Takeuchi, K. J., et al., "The Electrochemistry of Silver Hollandite Nanorods, AgxMn8O16: Enhancement of Electrochemical Battery Performance via Dimensional and Compositional Control," *J. Electrochem. Soc.,* 160, A3090-A3094 (2013) ["K. J. Takeuchi 2013"]; Okubo, M., et al., "Fast Li-Ion Insertion into Nanosized LiMn2O4 without Domain Boundaries," *ACS Nano,* 4, 741-752 (2010) ["M. Okubo 2010"]; Zhu, S., et al., "Nanocrystalline Magnetite: Synthetic Crystallite Size Control and Resulting Magnetic and Electrochemical Properties," *J. Electrochem. Soc.,* 157, A1158-A1163 (2010) ["S. Zhu 2010"]; Shen, Y., et al., "Controlling Size, Crystallinity, and Electrochemical Performance of Li4Ti5O12 Nano-crystals," *Chem. Mater.,* 25, 5023-5030 (2013) ["Y. Shen 2013"]; and Zhu, S., et al., "Crystallite Size Control and Resulting Electrochemistry of Magnetite, Fe3O4," *Electrochem. Solid-State Lett.*, 12, A91-A94 (2009) ["S. Zhu 2009"], each of which is incorporated by reference in its entirety.)

For Li ion batteries, the effect of material crystallite size on Li ion insertion/extraction in host materials continues to be an important research and design strategy. (See, e.g., K. J. Takeuchi 2012; K. J. Takeuchi 2013; M. Okubo 2010; S. Zhu 2010; Y. Shen 2013; and S. Zhu 2009.) Due to shorter Li ion diffusion pathways and larger surface area based on small crystallite size, electrode materials are able to achieve better rate capability, longer cycle life and higher operating voltage. The inventors recently reported the electrochemical investigation of silver hollandite ($Ag_xMn_8O_{16}$) as a potential cathode material in a rechargeable Li battery (K. J. Takeuchi 2012; K. J. Takeuchi 2013). The crystallite size is tuned by controlling Ag content per formula unit, where low Ag content material with small crystallite size shows elevated discharge voltage and high capacity. Furthermore, small DC resistance, good current capability, and fast Li ion kinetics are associated with small crystallite size materials, presenting the promise of improving electrochemical performance of materials by tuning the crystallite size (S. Zhu 2010; S. Zhu 2009).

For example, a synthetic control of crystallite size for the anode material $Li_4Ti_5O_{12}$ based on a pulsed supercritical reactor was recently reported (Y. Shen 2013). It is observed that $Li_4Ti_5O_{12}$ nanoparticles with small crystallite size and high crystallinity exhibit the best rate capability and cycle stability because of small charge transfer and low Li+ diffusion impedance.

For the preparation of $Ag_2VO_2PO_4$, previously reported syntheses, including both hydrothermal and reflux-based synthesis methods, (see, e.g., Kim, Y. J., et al., "Silver vanadium phosphorous oxide, Ag2VO2PO4: Chimie douce preparation and resulting lithium cell electrochemistry," *J. Power Sources*, 196, 6781-6787 (2011) ["Y. J. Kim 2011"], which is incorporated by reference in its entirety) required 3 to 4 days.

Fundamentally different from conventional heating methods, microwave-based reactions can provide the possibility of dramatically shortening reaction time, due to very localized increases in energy and temperature. (See, e.g., Kitchen, H. J., et al., "Modern Microwave Methods in Solid-State Inorganic Materials Chemistry: From Fundamentals to Manufacturing," *Chem. Rev.*, 114, 1170-1206 (2014) ["H. J. Kitchen 2014"]; Zhu, Y.-J., et al., "Microwave-Assisted Preparation of Inorganic Nanostructures in Liquid Phase," *Chem. Rev.*, 114, 6462-6555 (2014) ["Y.-J. Zhu 2014"]; and Collins, M. J., Jr., "Future trends in microwave synthesis," *Future Med. Chem.*, 2, 151-155 (2010), each of which is incorporated by reference in its entirety.)

Thus, microwave-based synthetic procedures have been developed for a number of inorganic materials in the liquid phase (Y.-J. Zhu 2014; see also Muthuswamy, E., et al., "Facile Synthesis of Germanium Nanoparticles with Size Control: Microwave versus Conventional Heating," *Chem. Mater.*, 25, 1416-1422 (2013), which is incorporated by reference in its entirety) as well as in the solid state (H. J. Kitchen 2014). Specifically, there is a variety of microwave-based syntheses for battery electrode materials, mainly microwave hydrothermal/solvothermal synthesis and microwave solid-state synthesis. (See, e.g., Harrison, K. L., et al., "Microwave-Assisted Solvothermal Synthesis and Characterization of Various Polymorphs of LiVOPO4," *Chem. Mater.*, 25, 1751-1760 (2013); Higuchi, M., et al., "Synthesis of LiFePO4 cathode material by microwave processing," *J. Power Sources*, 119-121, 258-261 (2003) ["M. Higuchi 2003"]; Muraliganth, T., et al., "Nanoscale networking of LiFePO4 nanorods synthesized by a microwave-solvothermal route with carbon nanotubes for lithium ion batteries," *J. Mater. Chem.*, 18, 5661-5668 (2008) ["T. Muraliganth 2008"]; Chen, K., et al., "Microwave-Hydrothermal Crystallization of Polymorphic MnO2 for Electrochemical Energy Storage," *J. Phys. Chem. C*, 117, 10770-10779 (2013); Beninati, S., et al., "MW-assisted synthesis of SVO for ICD primary batteries," *J. Power Sources*, 157, 483-487 (2006); and Yang, G., et al., "Temperature-controlled microwave solid-state synthesis of Li3V2(PO4)3 as cathode materials for lithium batteries," *J. Power Sources*, 195, 5374-5378 (2010), each of which is incorporated by reference in its entirety.)

For example, $LiFePO_4$ was synthesized using microwave processing where pure phase $LiFePO_4$ is obtained within 10 min and shows high electrochemical capacity and good cycle stability (M. Higuchi 2003). A microwave solvothermal approach is also employed to synthesize $LiFePO_4$ with uniform nanorod morphology in 5 min (T. Muraliganth 2008). The size of such nanorods could be controlled by changing reactant concentration.

While cathode materials for secondary Li-ion battery applications have advanced significantly in recent years, there remain challenges in controlling their properties during synthesis as well as in reducing preparation times to improve manufacturability.

SUMMARY

In view of the above-described problems needs and goals, a microwave hydrothermal method is disclosed by the inventors to synthesize $Ag_2VO_2PO_4$ within 1 hour, about 100 times shorter than previous methods. Notably, the crystallite size is successfully controlled, showing a linear trend with reaction temperature.

In one embodiment, a method of making a bimetallic polyanionic material is described. The method includes: combining precursors of the bimetallic polyanionic material at room temperature; heating the precursors of the bimetallic polyanionic material using microwave energy at a ramp rate to a reaction temperature; maintaining the heated precursors of the bimetallic polyanionic material at the reaction temperature for a reaction time to form a bimetallic polyanionic compound; and cooling the bimetallic polyanionic compound to room temperature.

In another embodiment, a method of making a composition comprising silver vanadium phosphorus oxide is described. The method includes: mixing vanadium oxide ($V_2O_5$), silver oxide ($Ag_2O$), and phosphoric acid ($H_3PO_4$, 85%) with deionized (pure) water; heating the mixture using microwave energy at a ramp rate to a reaction temperature; maintaining the heated mixture at the reaction temperature for a reaction time to form silver vanadium phosphorus oxide; and cooling the silver vanadium phosphorus oxide to room temperature. In some embodiments, the ramp rate is between 50° C./min and 60° C./min. In some embodiments, the reaction temperature is less than about 230° C.; generally, the reaction temperature is between about 50° C. and about 180° C. In some embodiments, the reaction time less than 12 hours; in others it is less than about 6 hours. In some embodiments, the reaction time is more than about 15 minutes, or about 30 minutes to 1.5 hours.

In a further embodiment, a method of controlling an average crystallite size of silver vanadium phosphorus oxide is described. The method includes: selecting a reaction temperature and a reaction time; heating a mixture of precursors of silver vanadium phosphorus oxide using microwave energy to the reaction temperature; holding the heated mixture at the reaction temperature for the reaction time; and cooling the silver vanadium phosphorus oxide to room temperature such that a desired average crystallite size is attained. In some embodiments, the average crystallite size is less than about 100 nm; in other embodiments it is less than or equal to 60 nm. In some embodiments, the average crystallite size attained is 42 nm.

This, being a summary, is necessarily brief and does not put forth all of the features and advantages of the novel synthesis, its resulting compounds, or their use in secondary battery applications. The invention may be more fully understood with reference to the drawings and the detailed description that follow.

DETAILED DESCRIPTION

Figure 1:
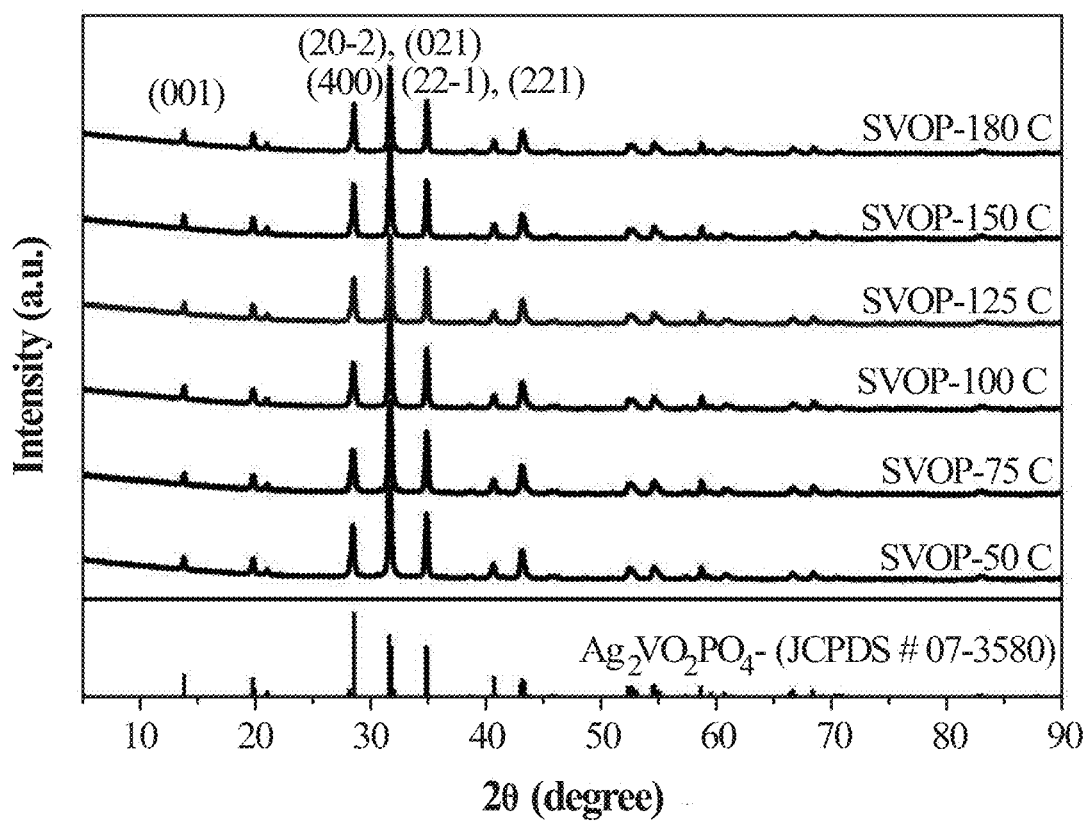
FIG. 1 is a chart that shows X-ray Diffraction (XRD) patterns for a $Ag_2VO_2PO_4$ standard and six samples of $Ag_2VO_2PO_4$ prepared by the methods disclosed herein.

The disclosed invention is a microwave hydrothermal method for synthesizing bimetallic polyanionic materials, such as $Ag_2VO_2PO_4$ (silver vanadium phosphorous oxide, SVOP), within about 1 hour, which is about 100 times shorter than previous methods of synthesizing this material. The material is synthesized as a crystalline material for which the crystallite (grain) size is successfully controlled, showing a linear trend with reaction temperature.

In the novel synthesis method, precursors of the bimetallic polyanionic material are first mixed for about an hour at room temperature by stirring, for example, using a magnetic stir bar. The precursors are then heated using microwave energy at a high ramp rate to the reaction temperature where they are held and allowed to react for more than 15 minutes, and generally for about 1 hour, with the temperature maintained by the addition of microwave energy. The resulting compound is cooled to room temperature and may then be rinsed with deionized (pure) water and dried in a vacuum oven. The ramp rate is generally between 50° C./min and 60° C./min. The reaction temperature is chosen to yield a particular crystallite size, and is less than about 230° C. and is generally between 50° C. and 180° C. The reaction time is chosen to yield completely reacted, phase-pure material in a minimum reaction time and is longer than 15 min, more generally about 30 min to 1.5 hours. Reaction times as long as 6 hours, or as long as 12 hours, may be desirable for some materials.

Mixing conditions for the precursors may be varied. For example, the precursors may be mixed by hand or not at all. The rate of stirring may vary from slow, to medium, to high rates. The time for which the precursors are mixed before applying microwave energy to them may range from a few minutes to several hours. Temperature ramp rates may be varied, as may reaction temperatures.

Cyclic voltammetry and galvanostatic measurements may be used to characterize the $Li^+$ insertion/extraction processes. Under galvanostatic reduction, the $Ag_2VO_2PO_4$ sample with the smallest crystallite size were found to deliver the highest capacity and to show the highest loaded voltage. Pulse discharge tests showed a significant resistance decrease during the initial discharge coincident with the formation of Ag metal. For this material, the magnitude of the decrease in resistance observed during pulse tests depended on the $Ag_2VO_2PO_4$ crystallite size, with the largest resistance decrease observed for the smallest crystallite size. Thus, these results demonstrate the ability to control crystallite size via microwave synthesis and a relationship between material crystallite size and resulting electrochemistry.

Partial reversibility of the Li/Ag$_2$VO$_2$PO$_4$ electrochemical reaction is observed after the replacement of Ag$^+$ with Li$^+$, but the original V—O—P—O layered structure is not fully recovered.

The novel microwave hydrothermal synthesis method is up to 100 times faster than previous methods used to synthesize bimetallic polyanionic materials, and silver vanadium phosphorus oxide in particular. The novel synthesis method also allows for control of the crystallite size in the resulting compounds.

Because it is found that electrochemical properties of bimetallic polyanionic materials, and of silver vanadium phosphorus oxide in particular, depend on crystallite size, the ability to control the crystallite size during synthesis of these materials is an advantage over previous synthesis methods. No secondary processing is necessary to attain the desired crystallite size; it is achieved during synthesis.

In particular, the novel synthesis method results in bimetallic polyanionic materials, and in silver vanadium phosphorus oxide as an example, having crystallites smaller than those achieved by prior methods. Crystallite sizes obtained for reaction temperatures between 50° C. and 180° C. are less than about 100 nm, and generally are between 42 nm and 60 nm.

Figure 11:
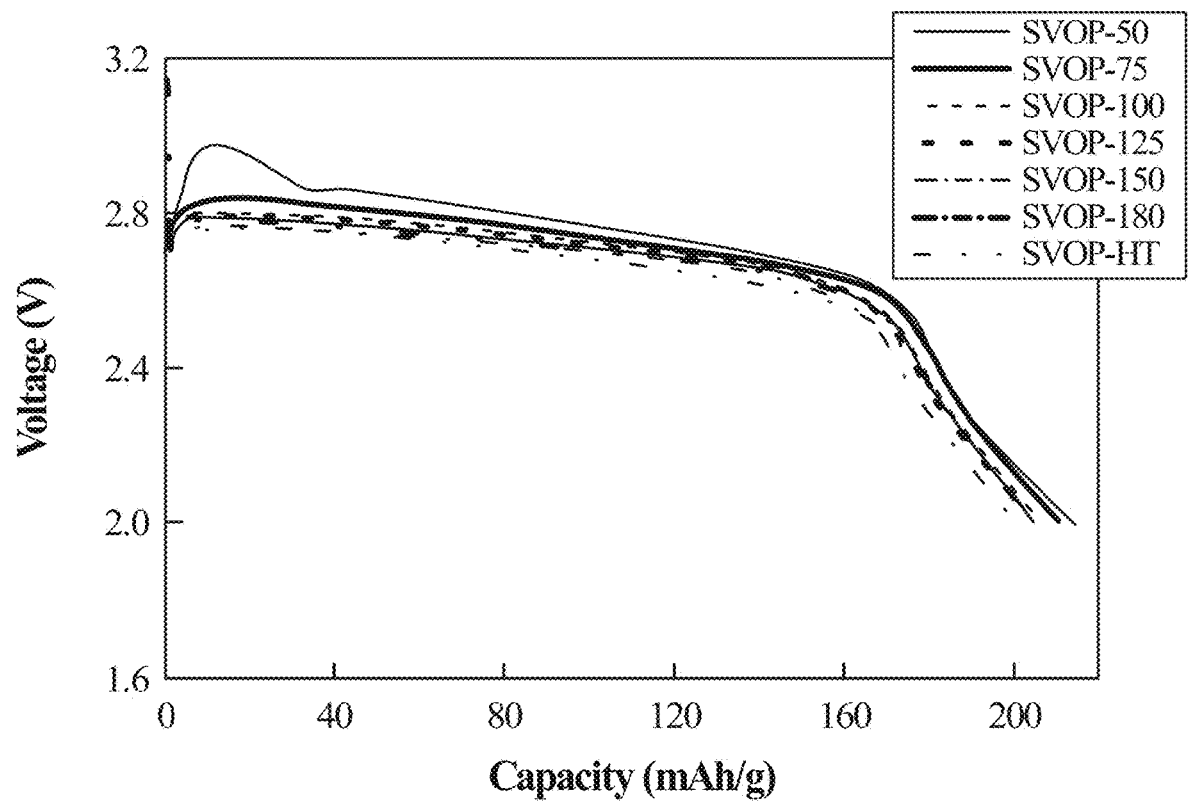
FIG. 11 is a plot that shows the first discharge curves of as-prepared materials in Li/$Ag_2VO_2PO_4$ cells.
Figure 14:
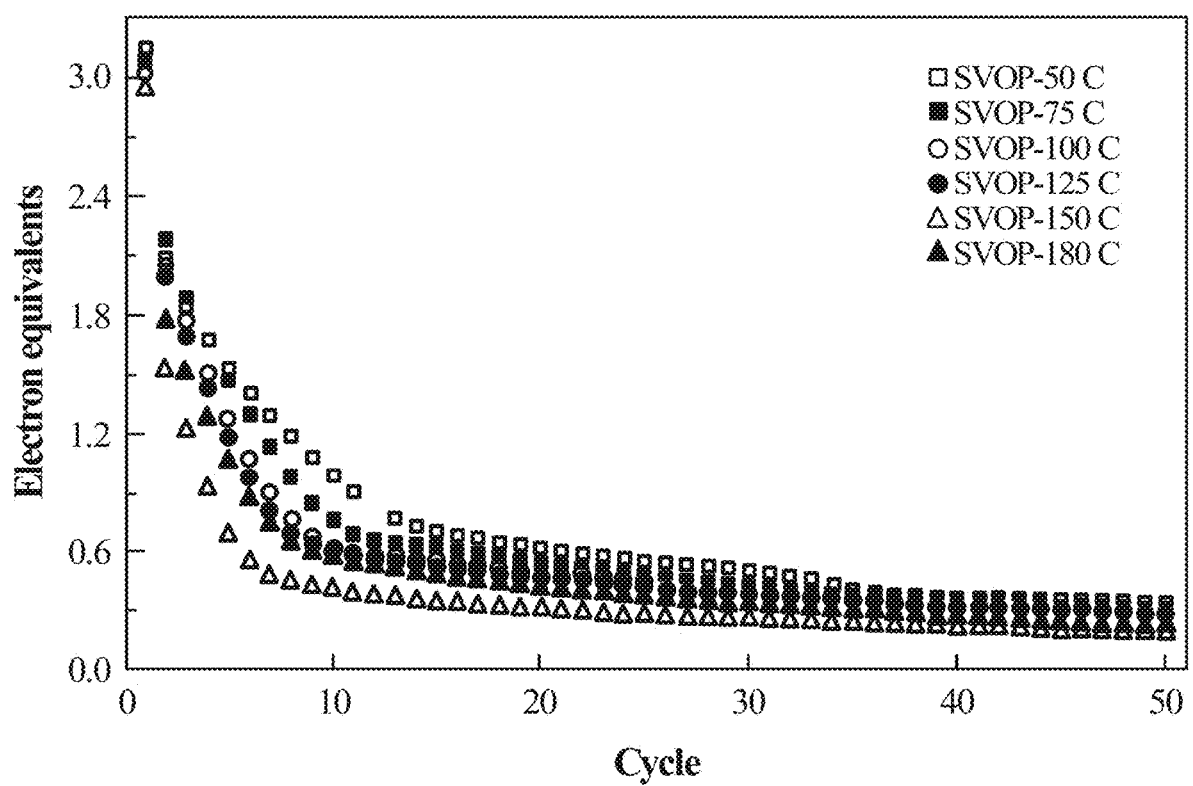
FIG. 14 is a plot that shows long-term cycling performance for six SVOP materials compared under cycling from 3.8 V to 2.0 V.

FIG. 11 shows the first discharge curves of as-prepared materials in Li/Ag$_2$VO$_2$PO$_4$ cells. All cells delivered capacities ranging from 200-215 mAh/g when discharged to 2.0 V. The long-term cycling performance for six SVOP materials was compared under cycling from 3.8 V to 2.0 V and is shown in FIG. 14. SVOP-50 is still able to utilize over 0.5 electron equivalents until cycle 30. These electrochemical properties of the as-synthesized SVOP materials demonstrate their suitability for use as cathode materials for secondary Li-ion battery applications.

Examples

Materials Synthesis

Precursors of the bimetallic polyanionic material of interest, for example, vanadium oxide (V$_2$O$_5$), silver oxide (Ag$_2$O), and phosphoric acid (H$_3$PO$_4$, 85%) for SVOP, were mixed in a microwaveable vessel with deionized water analogously to the previously reported hydrothermal method (A. C. Marschilok 2009; see also, e.g., Kang, H.-Y., et al., "Hydrothermal synthesis, crystal structure and ionic conductivity of Ag2VO2PO4: a new layered phosphate of vanadium(V)," *J. Chem. Soc., Dalton Trans.*, 1525-1528 (1993) ["H.-Y. Kang 1993"], which is incorporated by reference in its entirety). The mixture was then transferred to a microwave synthesizer (for example, a CEM Discover SP available from CEM Corporation, Matthews, N.C., USA) at room temperature and atmospheric pressure for microwave heating. The dynamic control option (maximum power: 200 W) was selected as the heating program, in which the temperature ramps to a given (reaction) temperature at heating rates of 50° C./min to 60° C./min and is then held at that temperature for 1 hour under microwave irradiation. The reaction temperature controls the resulting crystallite size. In order to obtain Ag$_2$VO$_2$PO$_4$ with different crystallite sizes, six reaction temperatures (50° C., 75° C., 100° C., 125° C., 150° C., and 180° C.) were investigated, while the same reaction time was maintained. The resulting samples were identified as SVOP-50, SVOP-75, SVOP-100, SVOP-125, SVOP-150, and SVOP-180, respectively. (These samples are identified as SVOP-50 C, SVOP-75 C, SVOP-100 C, SVOP-125 C, SVOP-150 C, and SVOP-180 C, respectively, in some Figures.) The as-prepared samples were washed with deionized water and dried in a vacuum oven. Table 1 shows the relationship between temperature and pressure (above atmospheric pressure) during SVOP growth.

TABLE 1

Relationship between reaction temperature and pressure during SVOP synthesis

| Sample ID | Temperature (° C.) | Pressure (psi gauge) |
|---|---|---|
| SVOP-50 | 50 | 0 |
| SVOP-75 | 75 | 0 |
| SVOP-100 | 100 | 3 |
| SVOP-125 | 125 | 3 |
| SVOP-150 | 150 | 70 |
| SVOP-180 | 180 | 144 |

In a particular example, vanadium oxide solid powder and silver oxide solid powder were weighed out in a 1:3:V$_2$O$_5$:Ag$_2$O ratio (by weight) and placed in a microwaveable vessel. To this was added phosphoric acid (H$_3$PO$_4$, 85%) diluted with deionized water (DI H$_2$O) in a ratio of 7:130:85% H$_3$PO$_4$:DI H$_2$O (by volume). At a particular scale, 0.1 g of V$_2$O$_5$ and 0.3 g of Ag$_2$O were combined with 0.7 mL (1.2236 g) of 85% H$_3$PO$_4$ mixed with 13 mL (13 g) of DI H$_2$O to yield 0.5 g of phase-pure Ag$_2$VO$_2$PO$_4$ after microwave synthesis. The mixture of precursors was combined at room temperature using a magnetic stir bar for about 1 hour. The mixture was then transferred to the microwave synthesizer and heated using microwave energy at a rate of 50° C./min to 60° C./min to the chosen reaction temperature, where it was held for about 1 hour under continuing microwave irradiation to complete the synthesis. Reaction times of up to 30 min were found insufficient to result in a complete synthesis of phase-pure Ag$_2$VO$_2$PO$_4$. The resulting compound was then cooled to room temperature, washed with DI water, and dried in a vacuum oven.

Deionized water may be replaced with another type of pure water as a precursor and as a wash agent. All precursors should be of high purity to reduce impurities in the resulting compound, unless intentional addition of dopants (impurities) is desired.

Physical Characterization of Samples

Powder X-ray diffraction (XRD) was employed to characterize the crystal structure and estimate crystallite sizes. The XRD patterns were measured by a Rigaku SmartLab X-ray diffractometer (available from Rigaku Americas Corporation, The Woodlands, Tex., USA) with Cu Kα radiation and Bragg-Brentano focusing geometry. Rietveld refinement of X-ray powder diffraction data was carried out using GSAS II (see, e.g., Toby, B. H., et al., "GSAS-II: the genesis of a modern open-source all purpose crystallography software package," *J. Appl. Crystallogr.*, 46, 544-549 (2013), which is incorporated by reference in its entirety). PDXL2 software was used for search-match analysis, and PeakFit version 4.12 was used to fit peaks for crystallite size calculation via the Scherrer equation (see, e.g., Scherrer, P., "Estimation of the size and internal structure of colloidal particles by means of Röntgen rays," *Nachr. Ges. Wiss. Gottingen*, 96-100 (1918) ["P. Scherrer 1918"], which is incorporated by reference in its entirety). A TA Instruments Q600 (available from TA Instruments, New Castle, Del., USA) was used to perform differential scanning calorimetry (DSC). Raman spectra were recorded using the XploRA™ Raman spectrometer (available from Horiba Scientific, Edison, N.J., USA), using a laser at a wavelength of 532 nm. Surface area of the samples was determined by a Quantachrome NOVA 4200 E (available from Quantachrome Instruments, Boynton Beach, Fla., USA) using the Brunauer-Emmett-Teller (BET) method. Inductively coupled plasma-optical emission spectroscopy (ICP-OES) was utilized to analyze the elemental composition by a Thermo Fisher iCAP 6300 series instrument (available from Thermo Fisher Scientific, Waltham, Mass., USA). Particle size of as-prepared samples was investigated by a Horiba La-950 V2 laser scattering particle size analyzer (available from Horiba Scientific, Edison, N.J., USA). SEM images were obtained on a JEOL 7600F Field Emission Scanning Electron Microscope (available from JEOL USA, Inc., Peabody, Mass., USA).

Electrochemical Characterization of Samples

Cyclic voltammetry and galvanostatic measurements are used to characterize the $Li^+$ insertion/extraction processes. Under galvanostatic reduction, the $Ag_2VO_2PO_4$ sample with the smallest crystallite size delivers the highest capacity and shows the highest loaded voltage. Pulse discharge tests show a significant resistance decrease during the initial discharge coincident with the formation of Ag metal where the magnitude of the resistance decrease observed during pulse tests depends on the $Ag_2VO_2PO_4$ crystallite size, with the largest resistance decrease observed for the smallest crystallite size. Partial reversibility of the $Li/Ag_2VO_2PO_4$ electrochemical reaction is observed after the replacement of $Ag^+$ with $Li^+$, but the original V—O—P—O layered structure is not fully recovered. These results demonstrate the ability to control crystallite size via microwave synthesis and a relationship between material crystallite size and resulting electrochemistry.

For all electrochemical tests, the electrolyte was $LiPF_6$ (1 M) in a mixture of ethylene carbonate (EC) and dimethyl carbonate (DMC). Electrode preparation was through a slurry of as-synthesized $Ag_2VO_2PO_4$ materials, graphite, acetylene black carbon, and polyvinylidene fluoride (PVDF) cast onto aluminum foil. A three-electrode assembly with lithium reference and auxiliary electrodes was utilized to collect cyclic voltammetry data. A scan rate of $5.00 \times 10^{-5}$ V/s was applied to the cell with voltage limits of 2.0 V and 3.8 V (vs $Li/Li^+$). Coin cells were fabricated with lithium metal electrodes to conduct galvanostatic measurements under a current density of 30 mA/g. AC impedance measurements were carried out using a Bio-Logic VSP impedance analyzer (available from Bio-Logic Science Instruments, Seyssinet-Pariset, France) with a 10-mV amplitude and a frequency range of 100 kHz to 0.1 Hz, and the Nyquist plots were normalized assuming a zero intercept at the high frequency x-axis intercept. For the pulse discharge tests, cells were discharged at a background current of 1.4 mA/g (0.0045 mA/cm$^2$) with 5-s intermittent pulses at a current density of 36 mA/g (0.12 mA/cm$^2$).

Characterization/Results $Ag_2VO_2PO_4$ had been previously synthesized by a hydrothermal method and a reflux-based method, both of which required long reaction times of up to 4 days (E. S. Takeuchi 2009; Y. J. Kim 2011). The hydrothermal synthesis method requires temperatures of about 230° C. Thus, the use of microwave-assisted synthesis was pursued to decrease total synthesis time and explore the opportunity for crystallite size control. Samples of $Ag_2VO_2PO_4$ were prepared over a range of temperatures, specifically at 50° C., 75° C., 100° C., 125° C., 150° C., and 180° C., and identified as SVOP-50, SVOP-75, SVOP-100, SVOP-125, SVOP-150, and SVOP-180, respectively. (These samples are identified as SVOP-50 C, SVOP-75 C, SVOP-100 C, SVOP-125 C, SVOP-150 C, and SVOP-180 C, respectively, in some Figures.)

FIG. 1 is a chart that shows the XRD patterns recorded for the samples of microwave-synthesized SVOP, along with the XRD pattern of a standard sample of $Ag_2VO_2PO_4$. All of the XRD peaks can be assigned to $Ag_2VO_2PO_4$ (JCPDS #07-3580) with no apparent impurities. As the reaction temperature decreases, peak broadening is apparent at 2θ=27°-30° and 52°-56°, indicating a decrease in crystallite size. Similarly, the relative intensity of the peak at 2θ=28° gradually increases when reaction temperature increases, consistent with the synthesis of more highly crystalline materials.

Figure 2A:
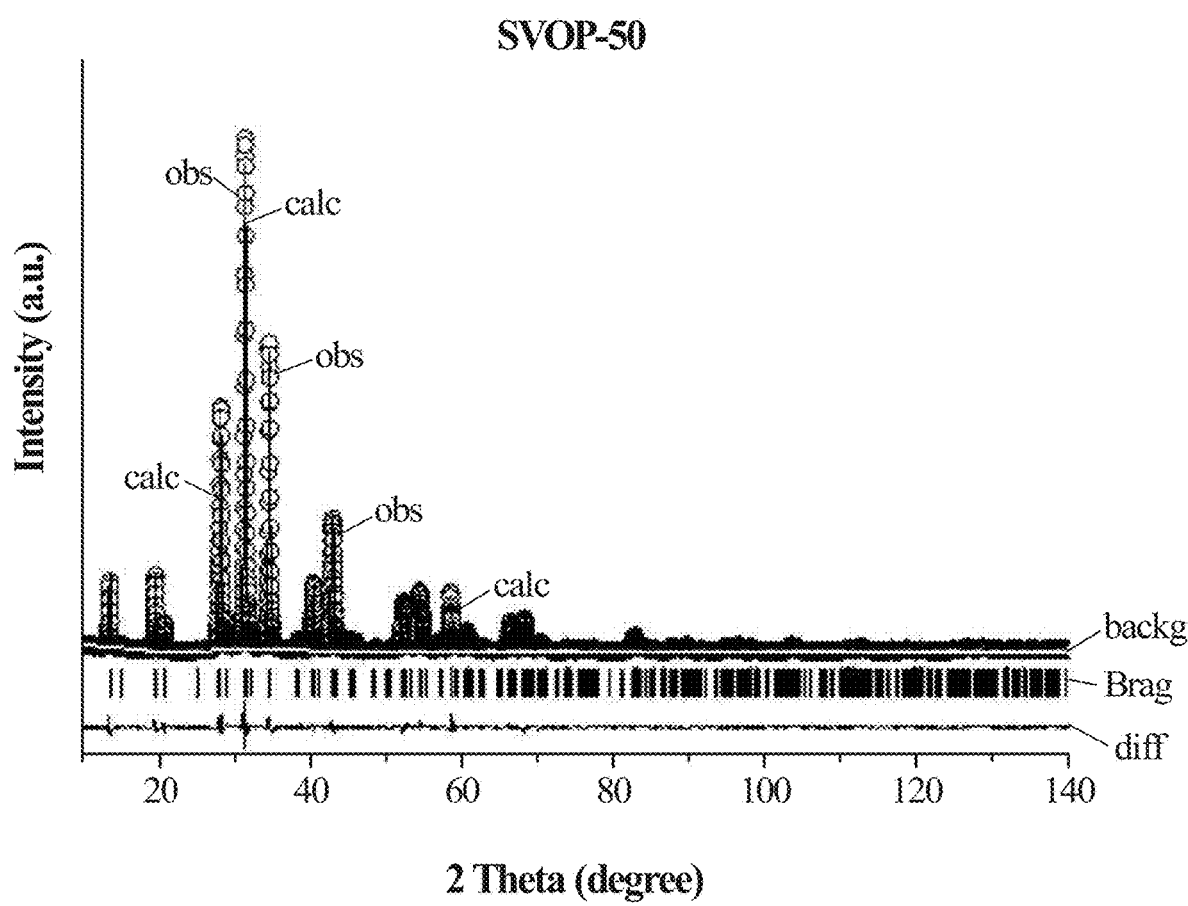
FIGS. 2A and 2B are charts that show Rietveld refinement of SVOP-50 and SVOP-180, respectively, that was performed based on monoclinic $Ag_2VO_2PO_4$.
Figure 2B:
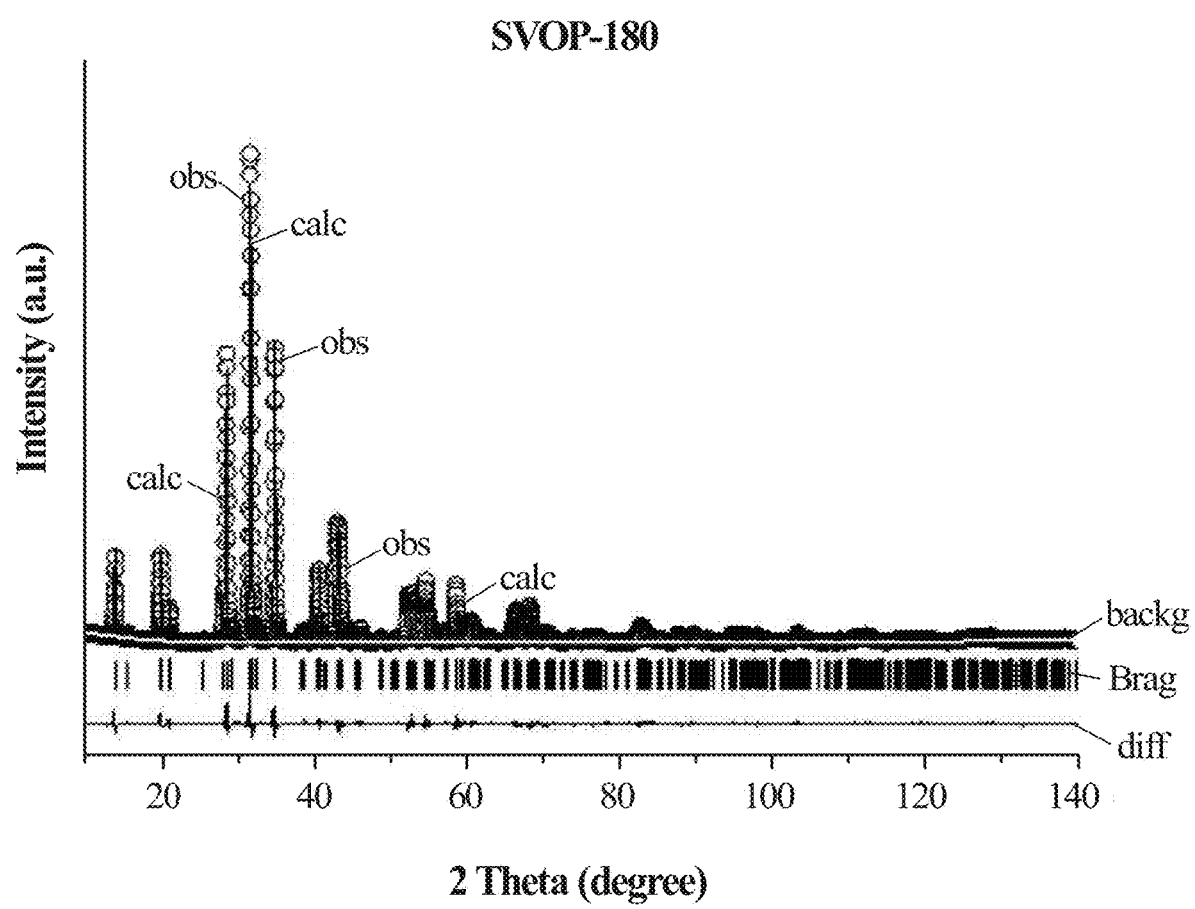

FIGS. 2A and 2B show Rietveld refinement of SVOP-50 and SVOP-180, respectively, that was performed based on monoclinic $Ag_2VO_2PO_4$ (H.-Y. Kang 1993). In FIGS. 2A and 2B the observed data (obs) are shown by open circles, the experimental background signal level (backg) is shown by the white line, intensity calculated from the monoclinic $Ag_2VO_2PO_4$ (calc) is shown as a solid line, and the location of the $Ag_2VO_2PO_4$ Bragg peaks are shown as a series of vertical lines (Brag). The difference between the background-subtracted observed data and the calculation is shown in the bottom line (diff) in each of FIGS. 2A and 2B. Both materials show reasonable fitted results with $R_{wp}$ values of 6.8% (SVOP-50) and 8.8% (SVOP-180). The refined cell parameters of SVOP-50 are a=12.4812(2) Å, b=6.2927(1) Å, c=6.3015(1) Å, and β=90.275(6)°, and those of SVOP-180 are a=12.4435(2) Å, b=6.2912(1) Å, c=6.3017(1) Å, and β=90.324(4)°, in accord with reported parameters of $Ag_2VO_2PO_4$ (H.-Y. Kang 1993). Specific Rietveld refinement results of SVOP-50 are shown in Tables 2 and 3, while those of SVOP-180 are shown in Tables 4 and 5.

TABLE 2

Summary of the Rietveld refinement results of SVOP-50.

$Ag_2VO_2PO_4$ (SVOP-50)

Symmetry: monoclinic

Space group: C12/m1 a = 12.4812(2) Å, b = 6.2927(1) Å, c = 6.3015(1) Å, β = 90.275(6)°

V = 494.91(1) Å$^3$ $R_{wp}$ = 6.8%, Goodness of Fit (GOF) = 1.67

| Atom | Wyckoff position | x | y | z | Occupancy |
|---|---|---|---|---|---|
| Ag | 8j | 0.8814(2) | 0.7585(3) | 0.3801(2) | 1 |
| V | 4i | 0.6210(5) | 0 | 0.0887(6) | 1 |
| P | 4i | 0.8469(5) | 0 | 0.8632(8) | 1 |
| O1 | 4i | 0.512(1) | 0 | 0.185(2) | 1 |
| O2 | 8j | 0.881(1) | 0.803(1) | 0.9752(7) | 1 |
| O3 | 4i | 0.7071(9) | 0 | 0.821(2) | 1 |
| O4 | 4i | 0.619(1) | 0.5 | 0.334(2) | 1 |
| O5 | 4i | 0.7098(9) | 0 | 0.275(2) | 1 |

TABLE 3

Summary of the anisotropic thermal parameters of Ag obtained from Rietveld refinement results of SVOP-50.

| Atom | U11 | U22 | U33 | U12 | U13 | U23 |
|------|-----|-----|-----|-----|-----|-----|
| Ag | 0.078(1) | 0.0317(7) | 0.0387(7) | 0.012(1) | −0.011(1) | −0.012(1) |

TABLE 4

Summary of the Rietveld refinement results of SVOP-180.
$Ag_2VO_2PO_4$ (SVOP-180)
Symmetry: monoclinic
Space group: C12/m1
a = 12.4435(2) Å, b = 6.2912(1) Å, c = 6.3017(1) Å, β = 90.324(4)°
V = 493.32(1) Å$^3$
$R_{wp}$ = 8.8%, Goodness of Fit (GOF) = 1.88

| Atom | Wyckoff position | x | y | z | Occupancy |
|------|------------------|---|---|---|-----------|
| Ag | 8j | 0.8816(2) | 0.7591(3) | 0.3802(2) | 1 |
| V  | 4i | 0.6186(5) | 0 | 0.0863(7) | 1 |
| P  | 4i | 0.8484(5) | 0 | 0.8588(9) | 1 |
| O1 | 4i | 0.508(1)  | 0 | 0.192(2)  | 1 |
| O2 | 8j | 0.8805(9) | 0.801(1) | 0.9778(8) | 1 |
| O3 | 4i | 0.709(1)  | 0 | 0.821(2)  | 1 |
| O4 | 4i | 0.607(1)  | 0.5 | 0.347(2) | 1 |
| O5 | 4i | 0.706(1)  | 0 | 0.269(2)  | 1 |

TABLE 5

Summary of the anisotropic thermal parameters of Ag obtained from Rietveld refinement results of SVOP-180.

| Atom | U11 | U22 | U33 | U12 | U13 | U23 |
|------|-----|-----|-----|-----|-----|-----|
| Ag | 0.056(1) | 0.0273(7) | 0.0275(7) | 0.010(1) | −0.0061(9) | −0.015(1) |

Figure 3:
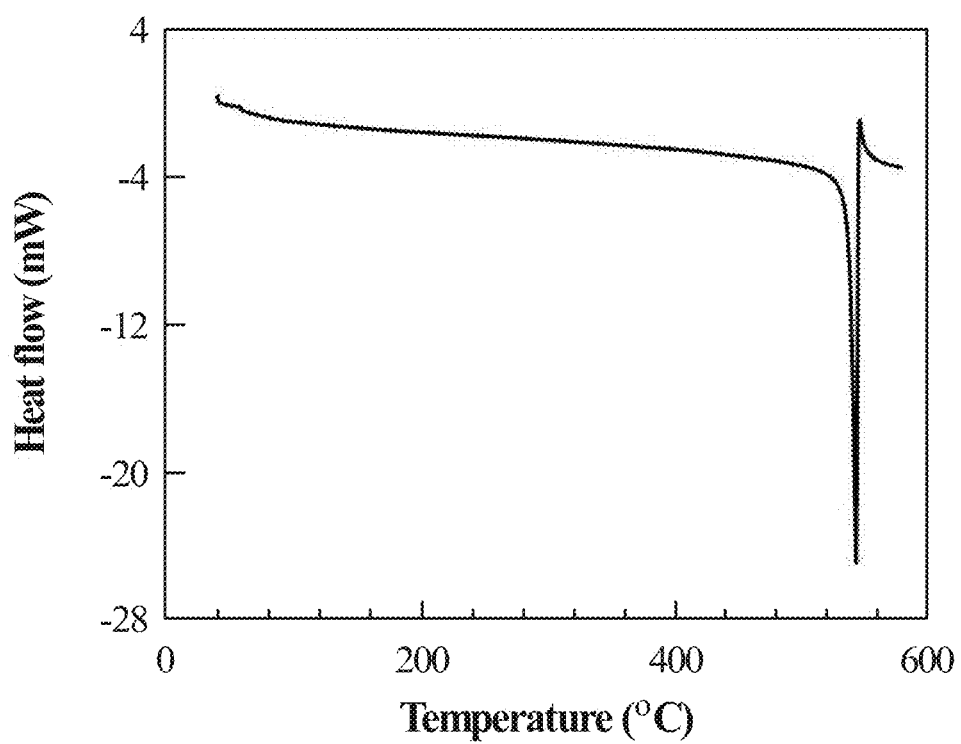
FIG. 3 is a plot that shows a differential scanning calorimetry (DSC) analysis of as-prepared $Ag_2VO_2PO_4$ exhibiting a single endothermic peak at ~540° C.

As seen in FIG. 3, differential scanning calorimetry (DSC) analysis of as-prepared $Ag_2VO_2PO_4$ shows only a single endothermic peak at ~540° C., consistent with previous reports (A. C. Marschilok 2009; Y. J. Kim 2011).

Figure 4:
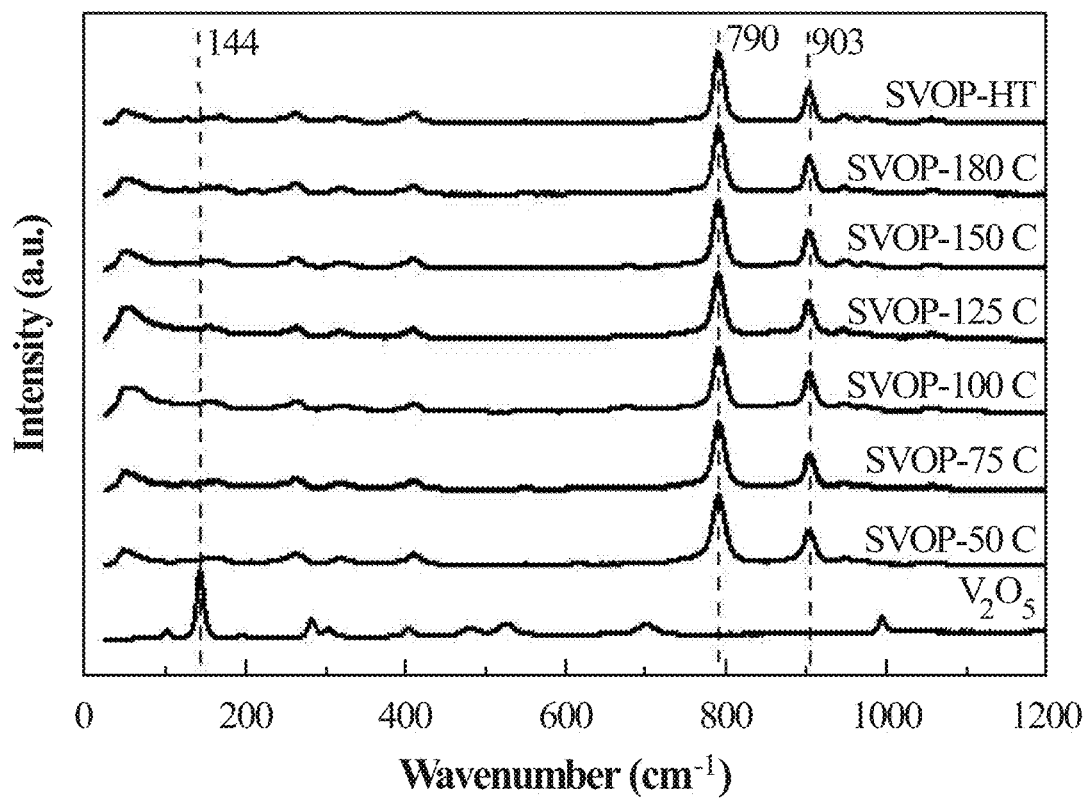
FIG. 4 is a plot that shows Raman spectra for $V_2O_5$, microwave-synthesized $Ag_2VO_2PO_4$, and hydrothermally synthesized $Ag_2VO_2PO_4$.

Raman spectra of as-synthesized materials are compared with $V_2O_5$ (a starting material in the reaction) and hydrothermally synthesized $Ag_2VO_2PO_4$ (SVOP-HT) in FIG. 4. The Raman spectrum of $V_2O_5$ powder displays a significant peak at 144 cm$^{-1}$ which is ascribed to signals of $B_{1g}$ and $B_{3g}$. (See, e.g., Baddour-Hadjean, R., et al., "Raman Microspectrometry Study of Electrochemical Lithium Intercalation into Sputtered Crystalline V2O5 Thin Films," *Chem. Mater.*, 20, 1916-1923 (2008); Lee, S.-H., et al., "Microstructure study of amorphous vanadium oxide thin films using raman spectroscopy," *J. Appl. Phys.*, 92, 1893 (2002); and Horrocks, G. A., et al., "Finite size effects on the structural progression induced by lithiation of V2O5: a combined diffraction and Raman spectroscopy study," *J. Mater. Chem. A*, 1, 15265-15277 (2013), each of which is incorporated by reference in its entirety.) For SVOP-HT, two intense peaks at 790 cm$^{-1}$ and 903 cm$^{-1}$ are observed, and there is no indication of two such bands in the $V_2O_5$ spectrum. All the as-synthesized materials (SVOP-50 C, SVOP-75 C, SVOP-100 C, SVOP-125 C, SVOP-150 C, and SVOP-180 C) show the same Raman spectra as SVOP-HT without peak shift. Additionally, no $V_2O_5$ Raman peak is detected from the spectra of hydrothermally synthesized and microwave-synthesized materials, indicating phase purity of the as-prepared samples.

Figure 5:
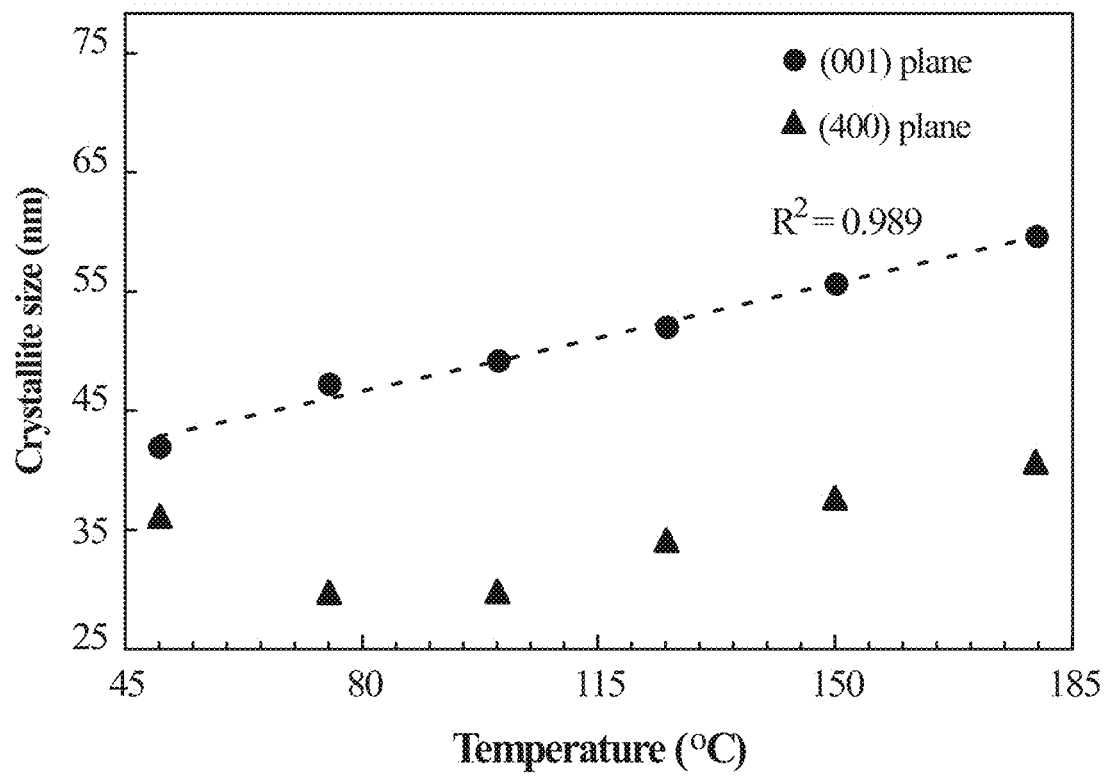
FIG. 5 is a plot that shows the relationship between crystallite size and reaction temperature, where the dots are calculated using the (001) plane and the triangles using the (400) plane.
Figure 6:
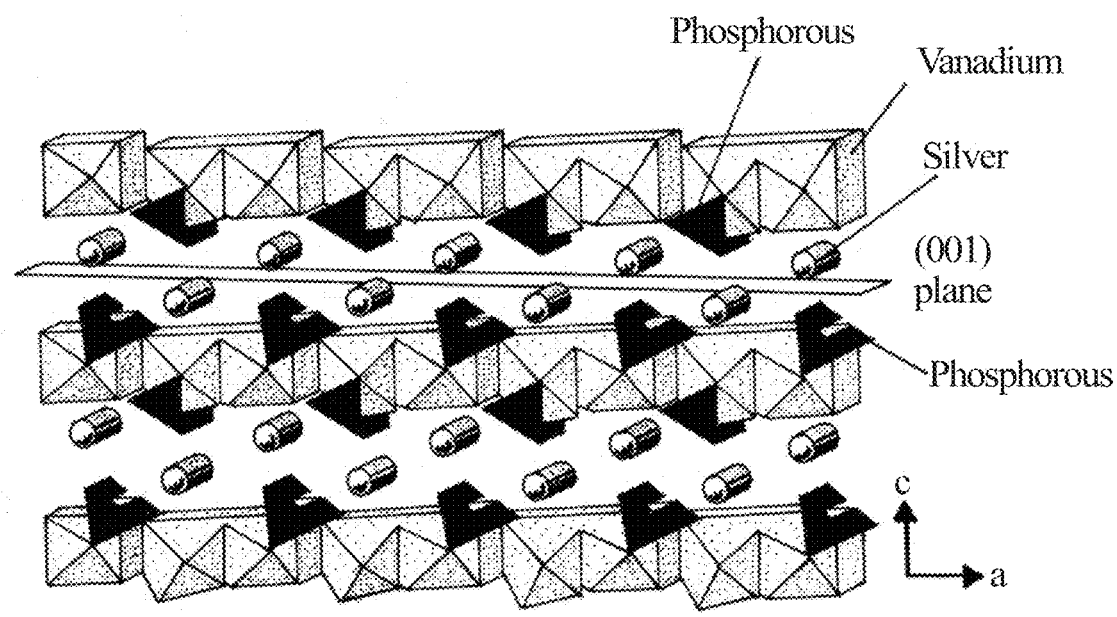
FIG. 6 is an artist's rendition of the crystal structure of $Ag_2VO_2PO_4$ viewed along the b-axis direction.
Figure 7A:
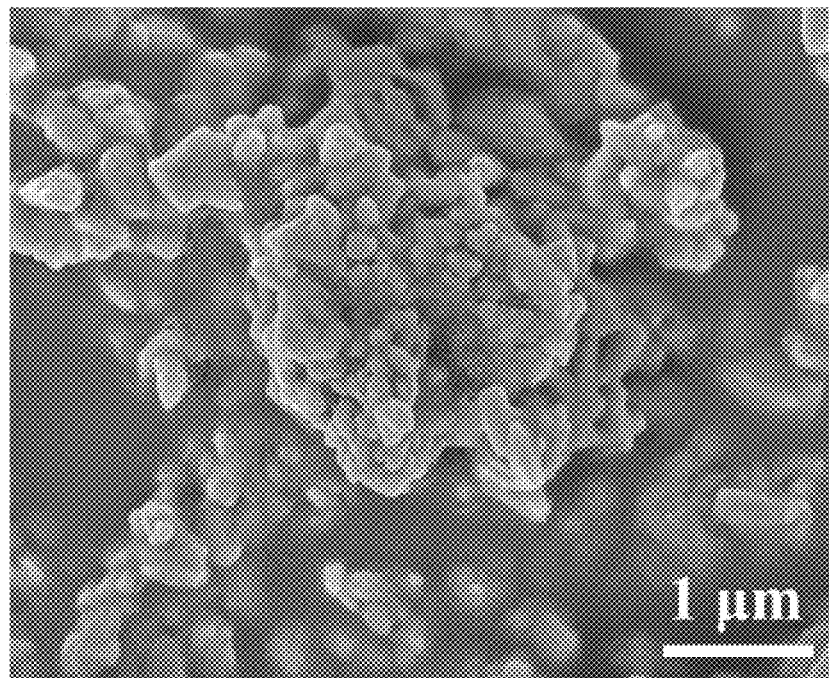
FIGS. 7A, 7B, 7C, 7D, 7E, and 7F are micrographs obtained by scanning electron microscopy (SEM) for samples SVOP-50, SVOP-75, SVOP-100, SVOP-125, SVOP-150, and SVOP-180, respectively.
Figure 7B:
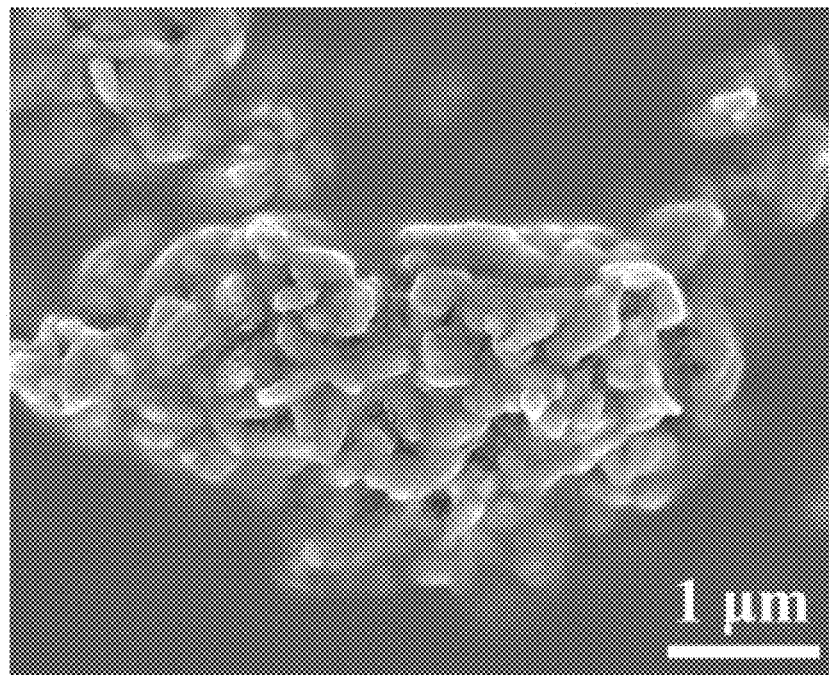
Figure 7C:
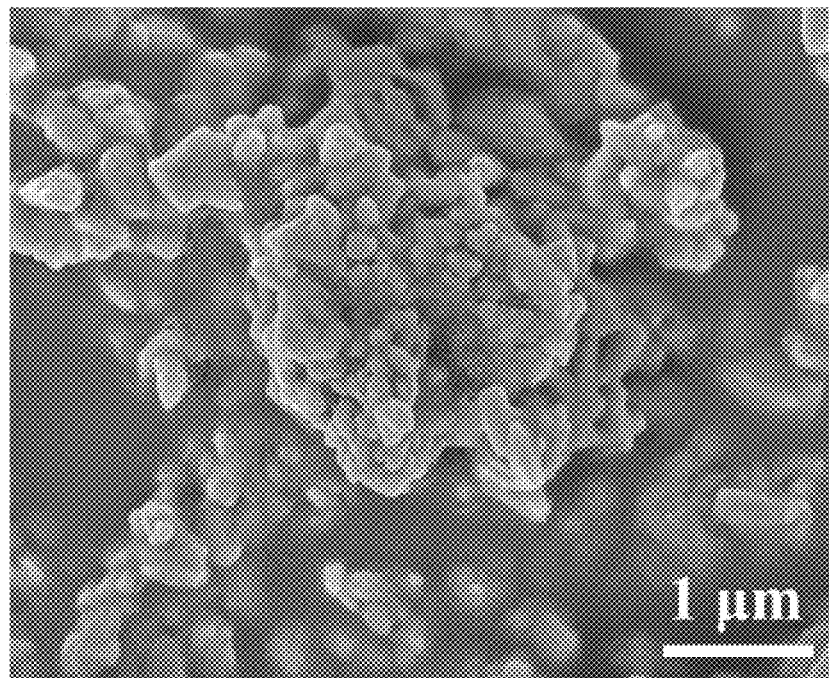
Figure 7D:
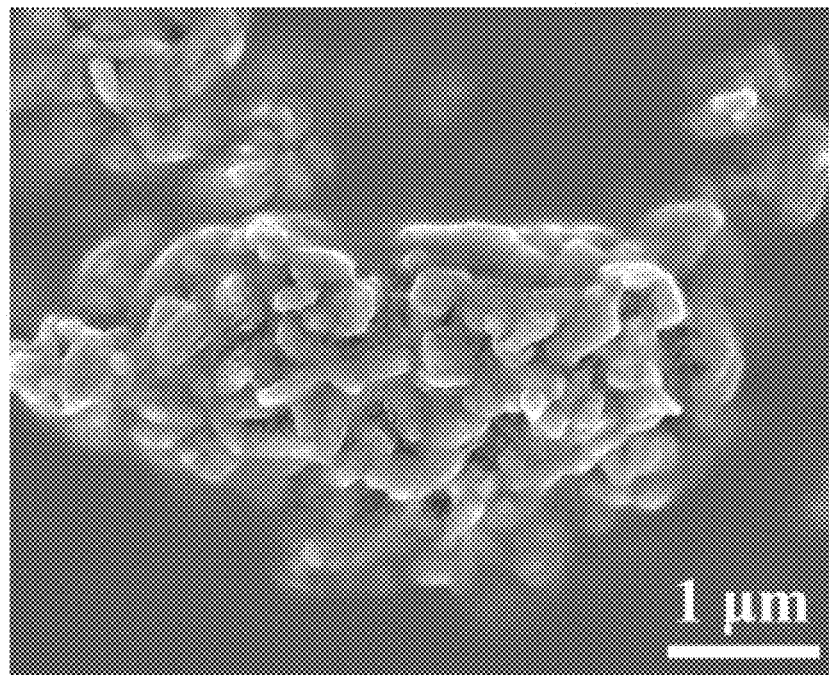
Figure 7E:
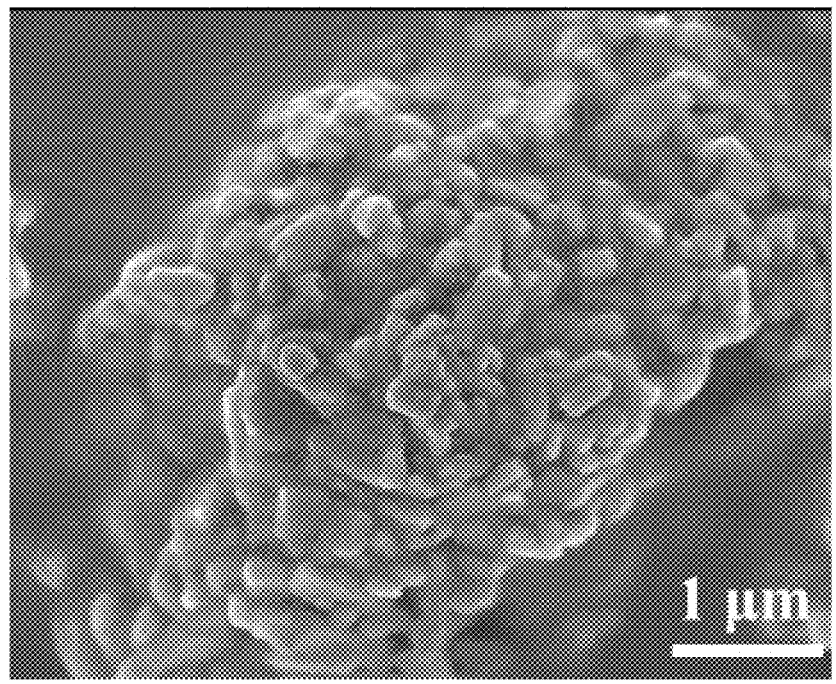
Figure 7F:
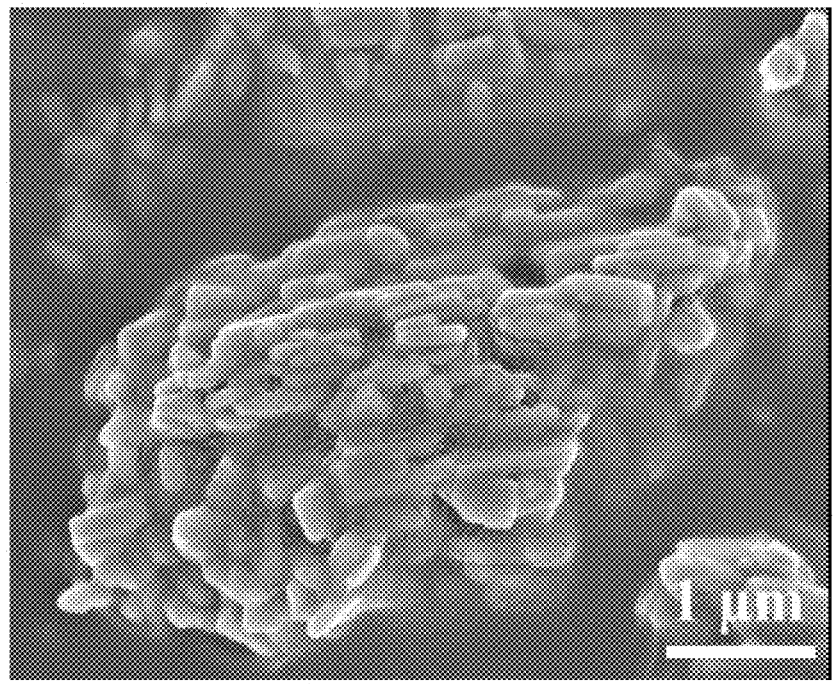

FIG. 5 shows the relationship between crystallite size (dots: (001) plane, triangles: (400) plane) and reaction temperature. The crystallite size was calculated from the XRD patterns using the Scherrer equation (P. Scherrer 1918). Two diffraction peaks at 2θ=14.05° and 2θ=28.70°, indexed as (001) and (400) planes, respectively, were selected for size analysis. The (001) plane is located in the position of the layers, which consist of dimers of edge-sharing VO octahedra and PO tetrahedra, as seen in FIG. 6. The as-prepared samples have smaller crystallite (grain) sizes than do previously reported materials, as seen in FIG. 5. Based on the (001) peak, the crystallite size varies from 42 to 60 nm and shows a linear relationship with reaction temperature, indicating that temperature is an important factor influencing the formation of layers. Synthesis under room temperature for 72 h was conducted, but some small peaks in the range of 400° C. to 500° C. in the DSC data were observed, indicating incomplete formation of the $Ag_2VO_2PO_4$ phase. Although there is no similar correlation for crystallite size along the a-axis, an increase in size is observed when the reaction temperature is above 100° C.

Figure 8:
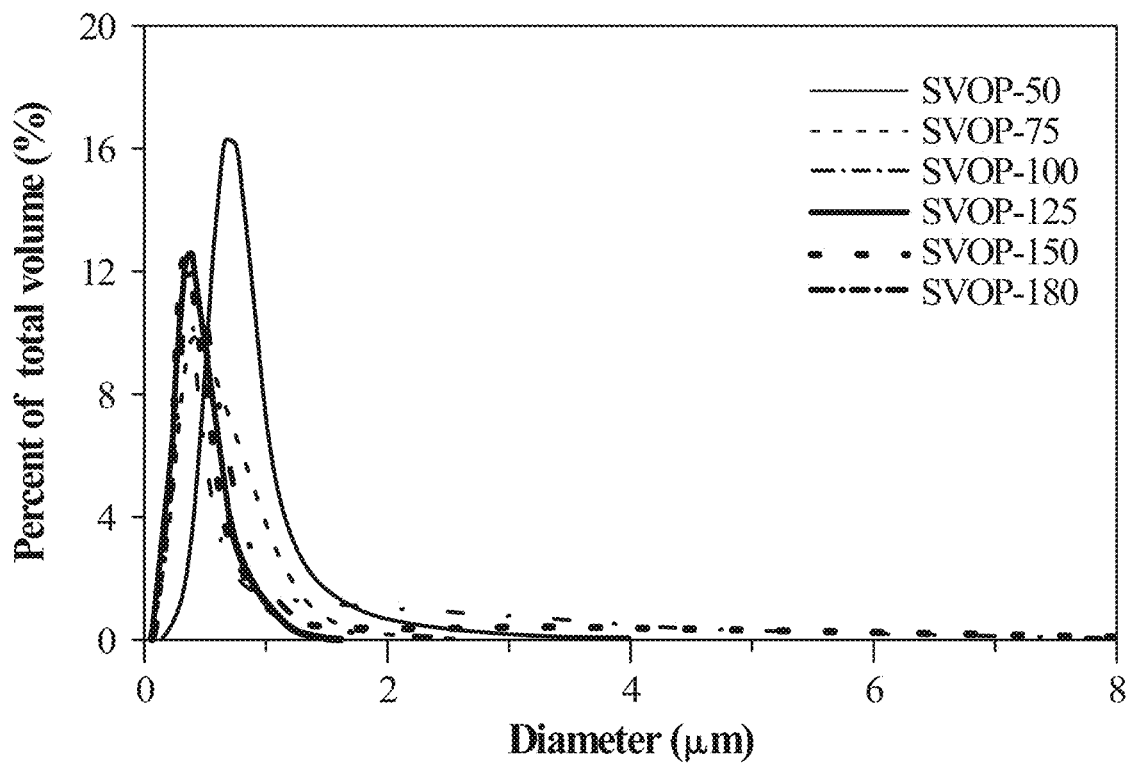
FIG. 8 is a plot that shows particle size distributions for the $Ag_2VO_2PO_4$ samples prepared as described.

SEM showed all samples have similar particle size and granular morphology, with dimensions ranging from 0.2 μm to 0.8 μm, as seen in FIGS. 7A, 7B, 7C, 7D, 7E, and 7F for samples SVOP-50, SVOP-75, SVOP-100, SVOP-125, SVOP-150, and SVOP-180, respectively. The inconsistency of crystallite size and particle size indicates that SVOP crystallites tend to aggregate into larger particles. In order to verify the observed particle sizes from SEM, particle size distribution of as-prepared materials was measured by laser light scattering with a particle size analyzer as seen in FIG. 8. All the samples showed mean particle sizes ranging from 0.4 μm to 0.7 μm by laser light scattering, consistent with the observed particle sizes in SEM images. BET surface area measurements showed little difference in the surface areas with a range of 5.7 m$^2$/g to 7.5 m$^2$/g for the as-prepared samples. The mean sizes of the particles for each sample are given in Table 6.

TABLE 6

Mean particle size measured by laser light scattering.

| Sample | Mean Size (μm) |
|--------|----------------|
| SVOP-50 | 0.72 |
| SVOP-75 | 0.49 |
| SVOP-100 | 0.57 |
| SVOP-125 | 0.38 |

TABLE 6-continued

Mean particle size measured by laser light scattering.

| Sample | Mean Size (μm) |
|---|---|
| SVOP-150 | 0.52 |
| SVOP-180 | 0.44 |

Figure 9:
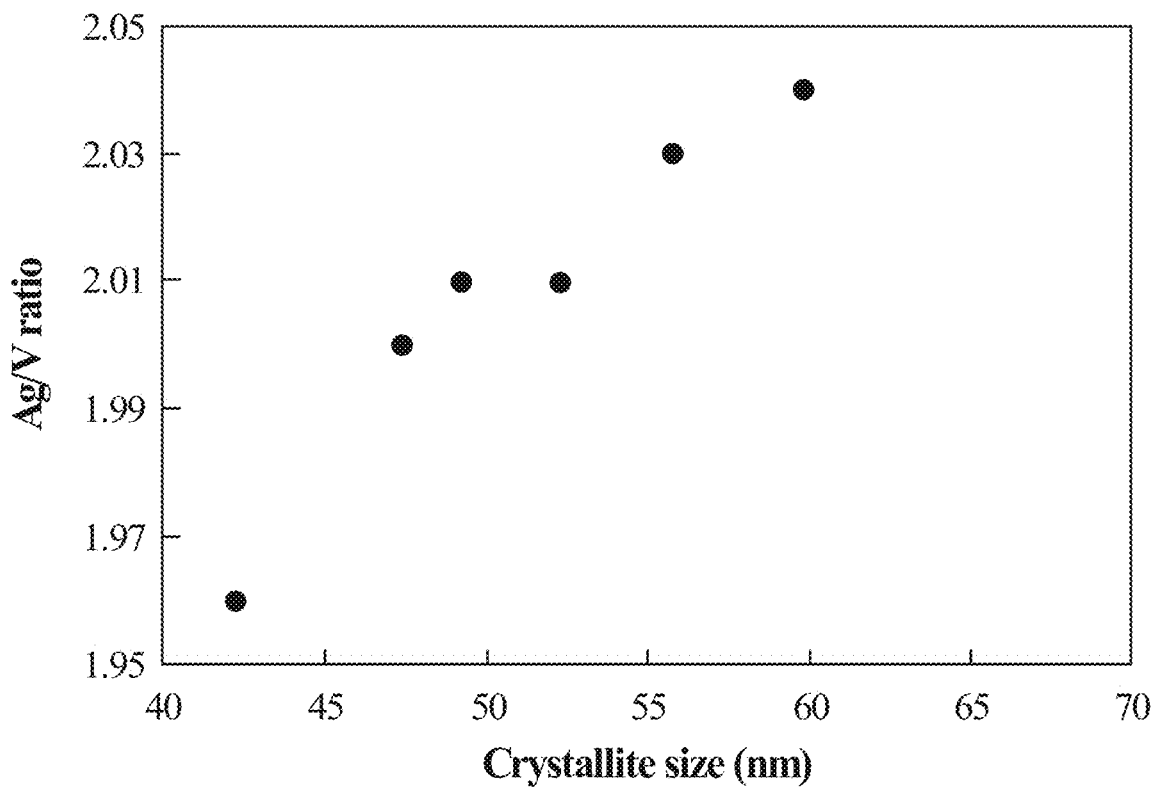
FIG. 9 is a plot that displays the relationship between Ag/V ratio and crystallite size along the c-axis.

In order to better understand the effects of synthesis temperature on crystallite size and elemental composition, ICP-OES was used to analyze the Ag/V ratio of $Ag_2VO_2PO_4$ materials with different crystallite sizes as shown in FIG. 9. Chemical formulae for the as-prepared samples, as determined by ICP, are shown in Table 7. It is shown that the (atomic) Ag/V ratio for SVOP-50 is 1.96, which is lower than the other samples. Such silver deficiency might be due to the surface defects of $Ag_2VO_2PO_4$ particles which are formed under low temperature. When the reaction temperature becomes higher the Ag/V ratio reaches 2.00 to 2.04, indicating a slight elemental compositional change based on reaction temperature.

TABLE 7

Chemical composition of as-prepared samples at different temperatures, as determined by ICP.

| Sample | Temperature (° C.) | Formula |
|---|---|---|
| SVOP-50 | 50 | $Ag_{1.96}VO_2P_{1.03}O_4$ |
| SVOP-75 | 75 | $Ag_{2.00}VO_2P_{1.02}O_4$ |
| SVOP-100 | 100 | $Ag_{2.01}VO_2P_{1.02}O_4$ |
| SVOP-125 | 125 | $Ag_{2.01}VO_2P_{1.01}O_4$ |
| SVOP-150 | 150 | $Ag_{2.03}VO_2P_{1.03}O_4$ |
| SVOP-180 | 180 | $Ag_{2.04}VO_2P_{1.03}O_4$ |

Figure 10A:
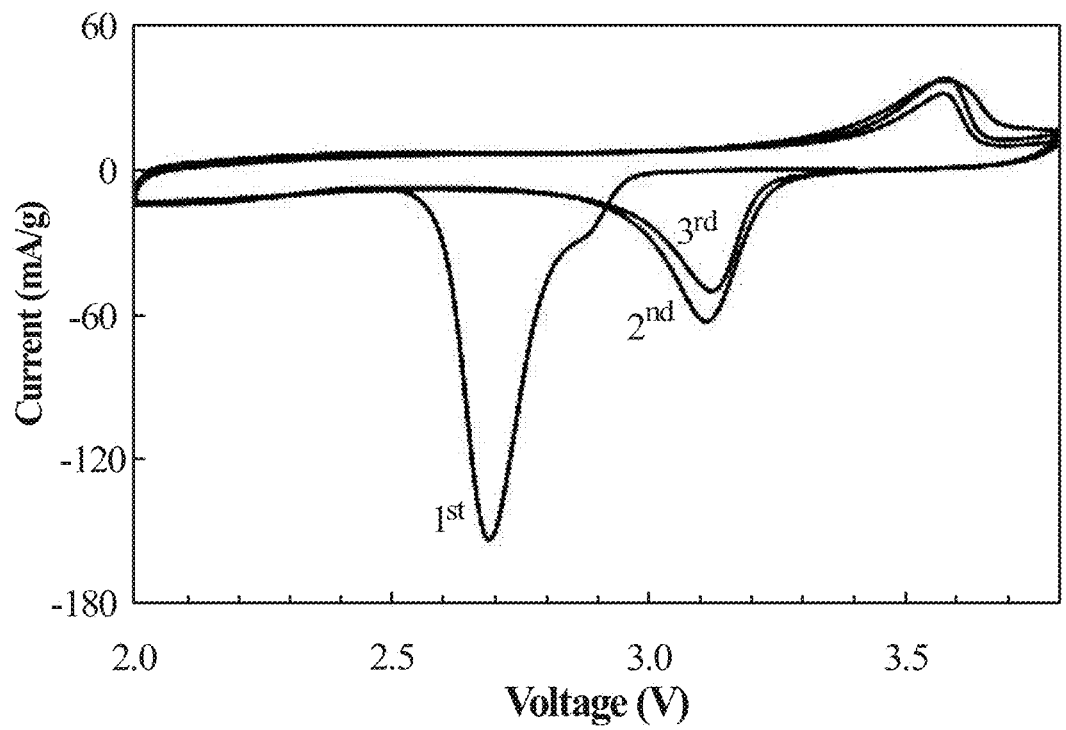
FIGS. 10A and 10B are plots that show cyclic voltammetry (CV) curves for samples SVOP-50 and SVOP-180, respectively.
Figure 10B:
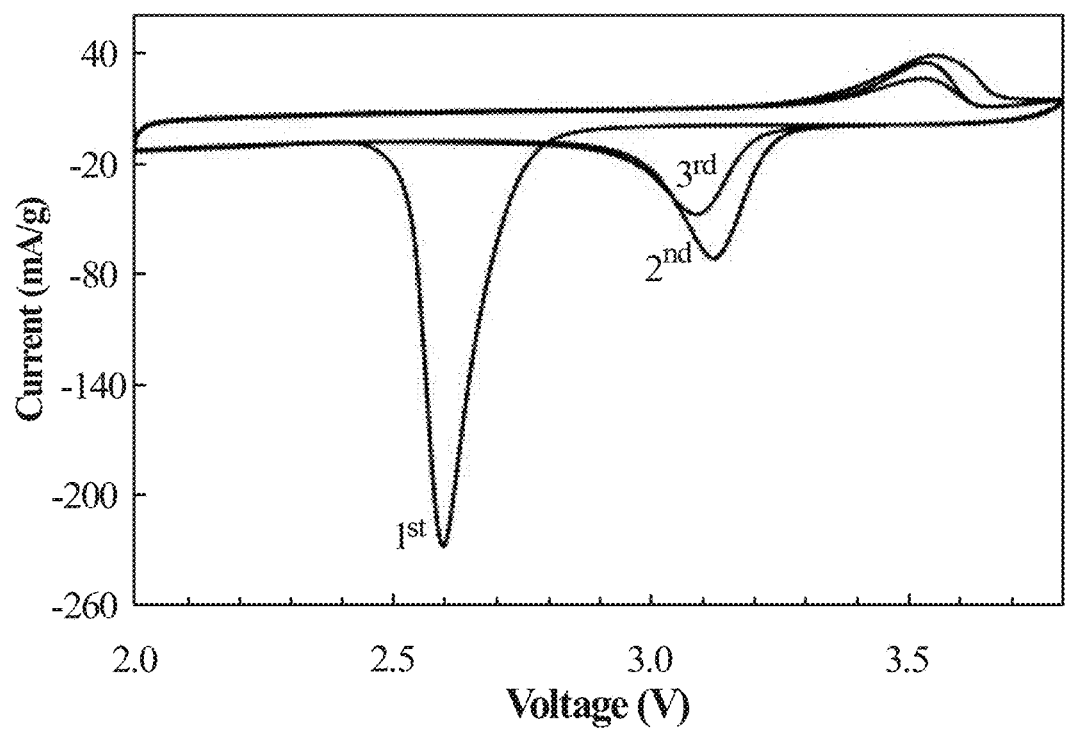

Cyclic voltammetry (CV) of $Ag_2VO_2PO_4$ was previously reported using a slow scan rate of $2.00 \times 10^{-5}$ V/s, and a major reduction peak was observed at 2.6 V with a minor peak at 2.9 V (E. S. Takeuchi 2009). Notably, there was no oxidation peak during oxidation. The reversibility of Li insertion into $Ag_2VO_2PO_4$ prepared via microwave-assisted synthesis was conducted. The voltammetry for SVOP-50 and SVOP-180 is shown as examples where both show major reduction peaks at ~2.7 V with a minor peak at 2.8 and 2.6 V, respectively, as shown in FIGS. 10A and 10B, respectively. On the reverse scan, oxidation peaks at ~3.5 are seen for both samples. During the second scan, a reduction peak of lower current is apparent for both samples at 3.1 V, a significantly higher voltage than seen for the reduction peak during the first scan seen at 2.6 V to 2.7 V. The redox peaks for the third scan are similar to those of the second scan located at 3.1 V and 3.6 V. The voltammetric peak voltages for as-prepared materials are summarized in Table 8 along with their associated discharge capacities. The results for the second cycle are summarized in Table 9 where some level of reversibility is noted for all samples.

TABLE 8

Summary of first-cycle peak voltages and associated discharge capacities of Li-based electrochemical cells containing as-prepared SVOP materials.

| Sample | 1st reduction peak voltage (V) | Capacity for 1st reduction peak (mAh/g) |
|---|---|---|
| SVOP-50 | 2.69 (2.88 minor peak) | 129 |
| SVOP-75 | 2.63 | 140 |
| SVOP-100 | 2.59 | 147 |
| SVOP-125 | 2.60 | 160 |
| SVOP-150 | 2.62 | 135 |
| SVOP-180 | 2.59 | 138 |

TABLE 9

Summary of second-cycle reduction and oxidation peak voltages and associated discharge capacities of Li-based electrochemical cells containing as-prepared SVOP materials.

| Sample | 2nd reduction peak voltage (V) | Capacity for 2nd reduction peak (mAh/g) | 2nd oxidation peak voltage (V) | Capacity for 2nd oxidation peak (mAh/g) |
|---|---|---|---|---|
| SVOP-50 | 3.11 | 65 | 3.57 | 23 |
| SVOP-75 | 3.17 | 62 | 3.66 | 23 |
| SVOP-100 | 3.12 | 60 | 3.57 | 30 |
| SVOP-125 | 3.14 | 55 | 3.58 | 16 |
| SVOP-150 | 3.17 | 61 | 3.61 | 13 |
| SVOP-180 | 3.12 | 59 | 3.54 | 19 |

FIG. 11 shows the first discharge curves of as-prepared materials in $Li/Ag_2VO_2PO_4$ cells. The first discharge curves under galvanostatic control of as-prepared samples at a current density of 30 mA/g are used to illustrate the discharge characteristics. All cells delivered capacities ranging from 200 mAh/g to 215 mAh/g when discharged to 2.0 V. Sample SVOP-50 shows the highest capacity, 214 mAh/g, while SVOP-150 and SVOP-180 deliver 201 mAh/g and 205 mAh/g, respectively. Thus, a trend of decreasing capacity as crystallite size increases is observed. The discharge curves display relatively flat voltage plateaus above 2.5 V, where the samples prepared at lower temperatures show higher operating voltage during discharge. The discharge voltage at 100 mAh/g is plotted vs crystallite size along the c-axis in FIG. 12. Operating voltage increases as crystallite size decreases when the size is smaller than 50 nm but remains constant as the crystallite size becomes larger. In addition, a higher voltage plateau in the initial discharge process of SVOP-50 is observed, which corresponds to a minor peak in the CV plot. It was reported that $Ag_{0.48}VOPO_4 \cdot 1.9H_2O$ showed two voltage plateaus where the reduction of vanadium dominated during the higher voltage plateau, while the reductions of silver and vanadium occurred concurrently for $Ag_2VO_2PO_4$ (E. S. Takeuchi 2009; Y. J. Kim 2011). These differences have been previously rationalized by the Ag/V ratio and the accompanying difference in average electronegativity per atom (Y. J. Kim 2011). Thus, it may be that the surface silver deficiency of SVOP-50 could induce a predominant reduction of vanadium during the initial discharge process, resulting in a higher discharge voltage. Compared to the samples synthesized by a microwave-assisted method, SVOP-HT delivers a capacity of 205 mAh/g showing a similar discharge profile as SVOP-150 and SVOP-180.

Figure 12:
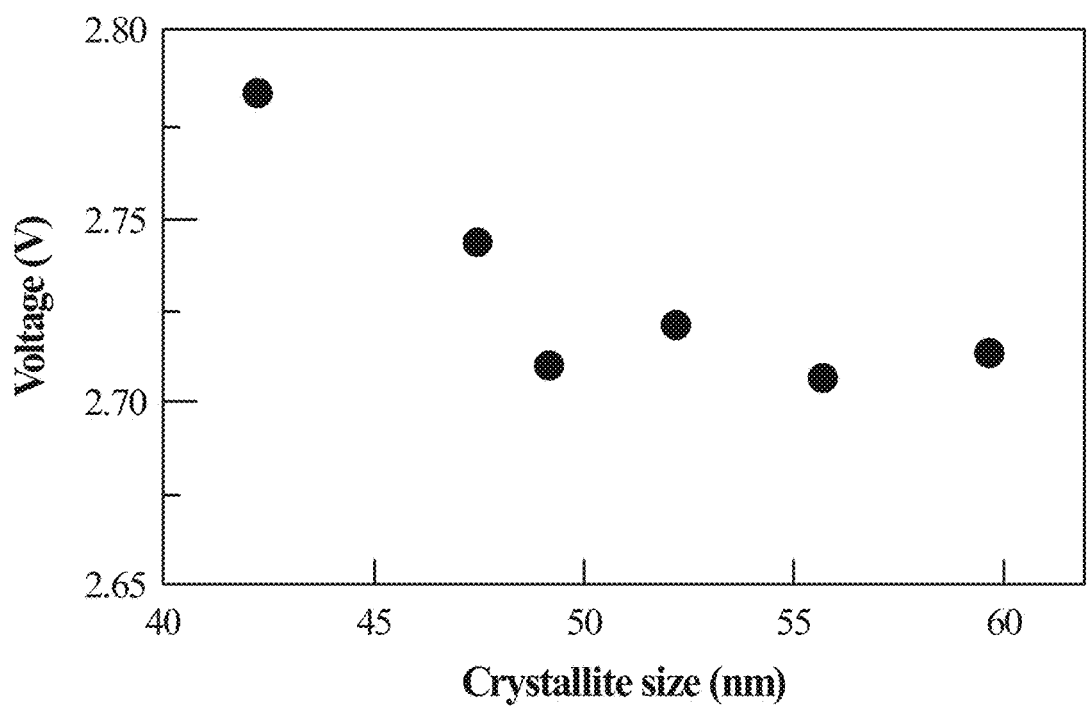
FIG. 12 is a plot that shows the relationship between discharge voltage at 100 mAh/g and crystallite size along the c-axis.

FIG. 12 shows the relationship between discharge voltage at 100 mAh/g and crystallite size along the c-axis.

Figure 13A:
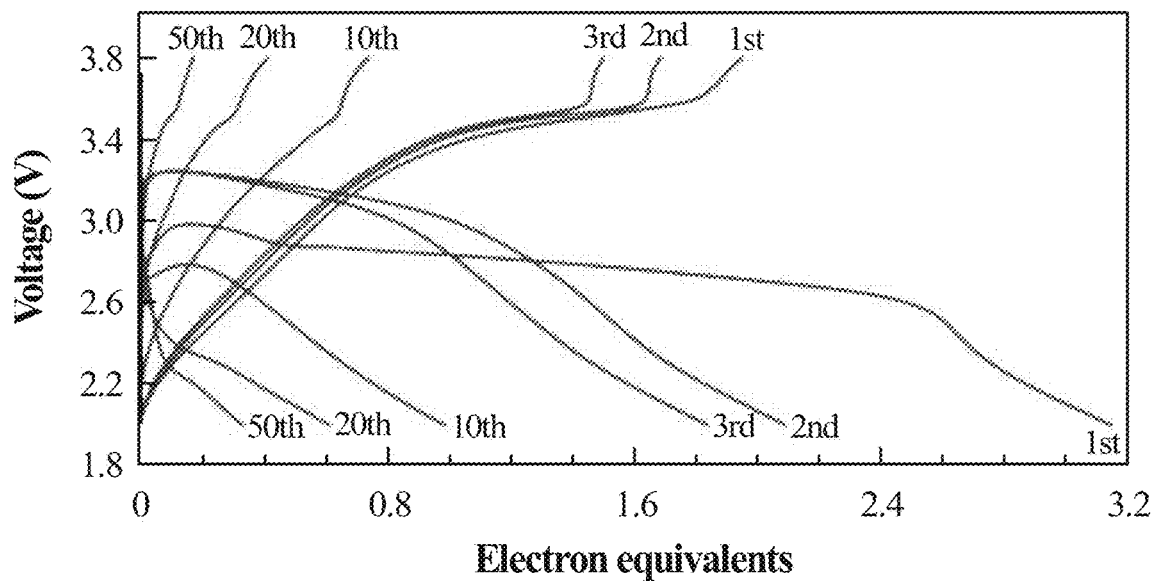
FIGS. 13A and 13B are plots that show the discharge-charge curves of SVOP-50 and SVOP-180, respectively.
Figure 13B:
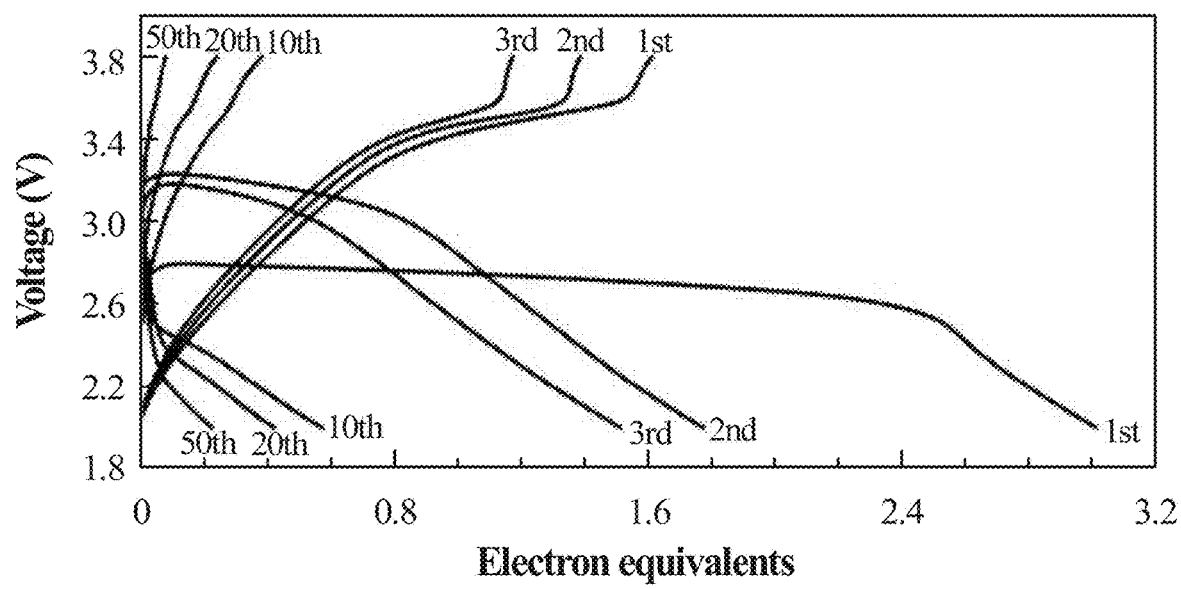

To probe the mechanism of Li insertion/extraction, the discharge-charge curves for the samples were collected, where Samples SVOP-50 and SVOP-180 are shown in FIGS. 13A and 13B, respectively. For SVOP-50, 3.14 electron equivalents per formula unit are transferred during the first discharge cycle. Based on the findings of previous research by the inventors (E. S. Takeuchi 2009), full discharge of 4 electron equivalents corresponds to the reduction of $V^{5+}$. In this case, the reduction by 3.14 electron equivalents would represent less than the full theoretical capacity. When the cell is charged to 3.8 V, 1.94 electron equivalents are realized where the oxidation of the vanadium site is expected. The voltage plateau of the second cycle is similar to the third cycle but is significantly different from the first cycle, which is in good agreement with results of the CV measurements. As the cycling test proceeds, the second and third discharge cycles deliver 2.09 and 1.84 electron equivalents, respectively. In comparing the discharge-charge curves of samples SVOP-50 and SVOP-180, the SVOP-50 sample with small crystallite size shows higher discharge capacity in each cycle. Notably, SVOP-50 maintains reduction of about 1 electron equivalent in the 10th cycle, while only 0.57 electron equivalents are realized for SVOP-180. This demonstrates that small crystallite size is conducive to maintaining capacity during the discharge/charge process. For the 20th through 50th cycles, the SVOP-50-containing cells still deliver higher electron equivalents, but the profiles of discharge-charge curves for both samples become similar.

The long-term cycling performance for six SVOP materials was compared under cycling from 3.8 V to 2.0 V and is shown in FIG. 14. Dramatic capacity fading before cycle 10 is observed for all the samples. However, SVOP-50 and SVOP-75 deliver more electron equivalents at cycle 10 and show slower capacity fading than the other samples. After cycle 10, electron equivalents are maintained at the range of 0.2 to 0.5 for samples with large crystallite size, while SVOP-50 is still able to utilize more than 0.5 electron equivalents until cycle 30.

Figure 15:
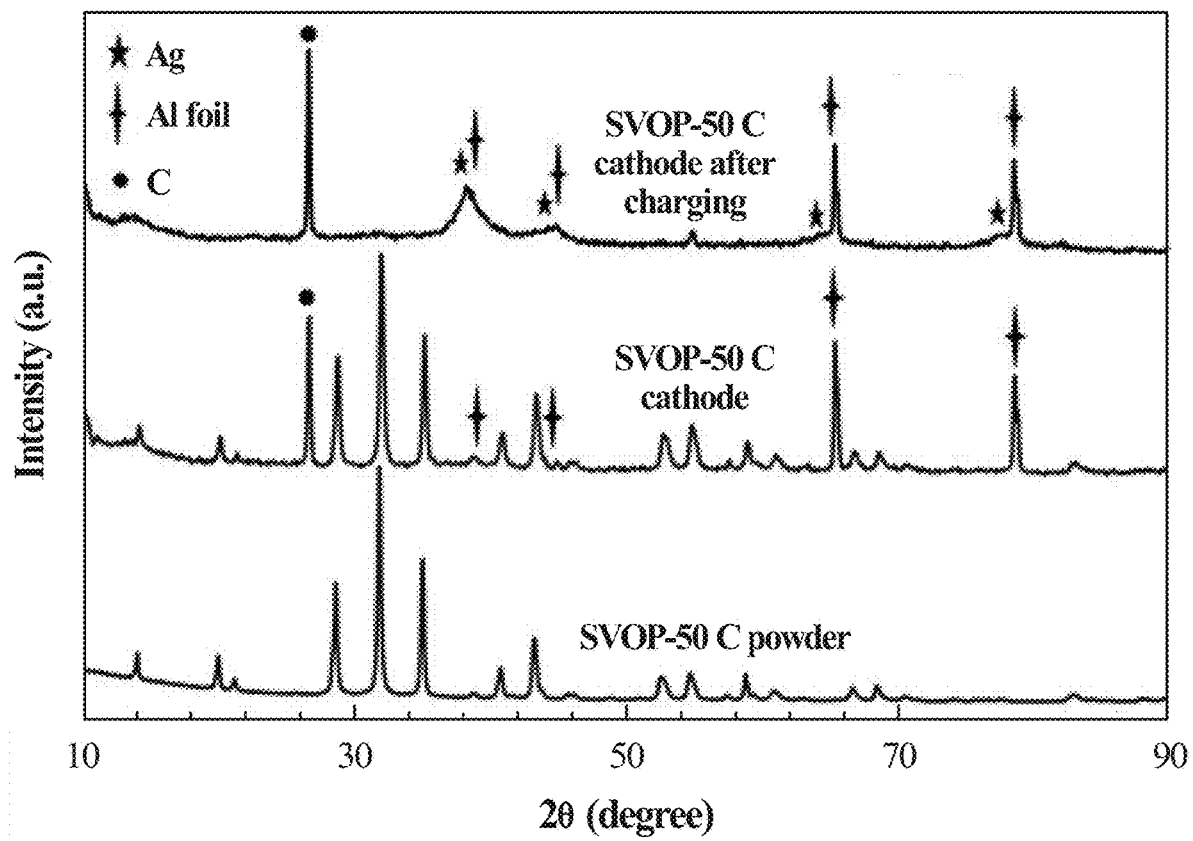
FIG. 15 is a plot that shows a comparison of the XRD patterns of SVOP-50 powder, SVOP-50 cathode before electrochemical measurements, and SVOP-50 cathode after charging.
Figure 16:
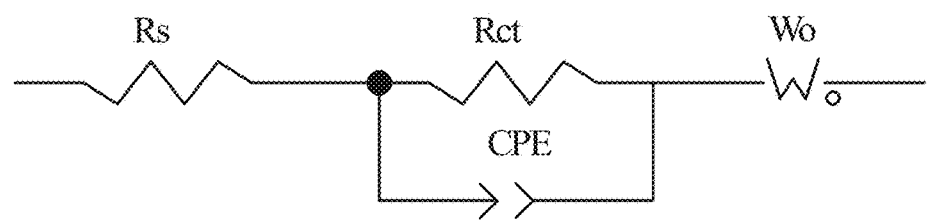
FIG. 16 is a drawing that shows an equivalent circuit used to fit impedance data.
Figure 17:
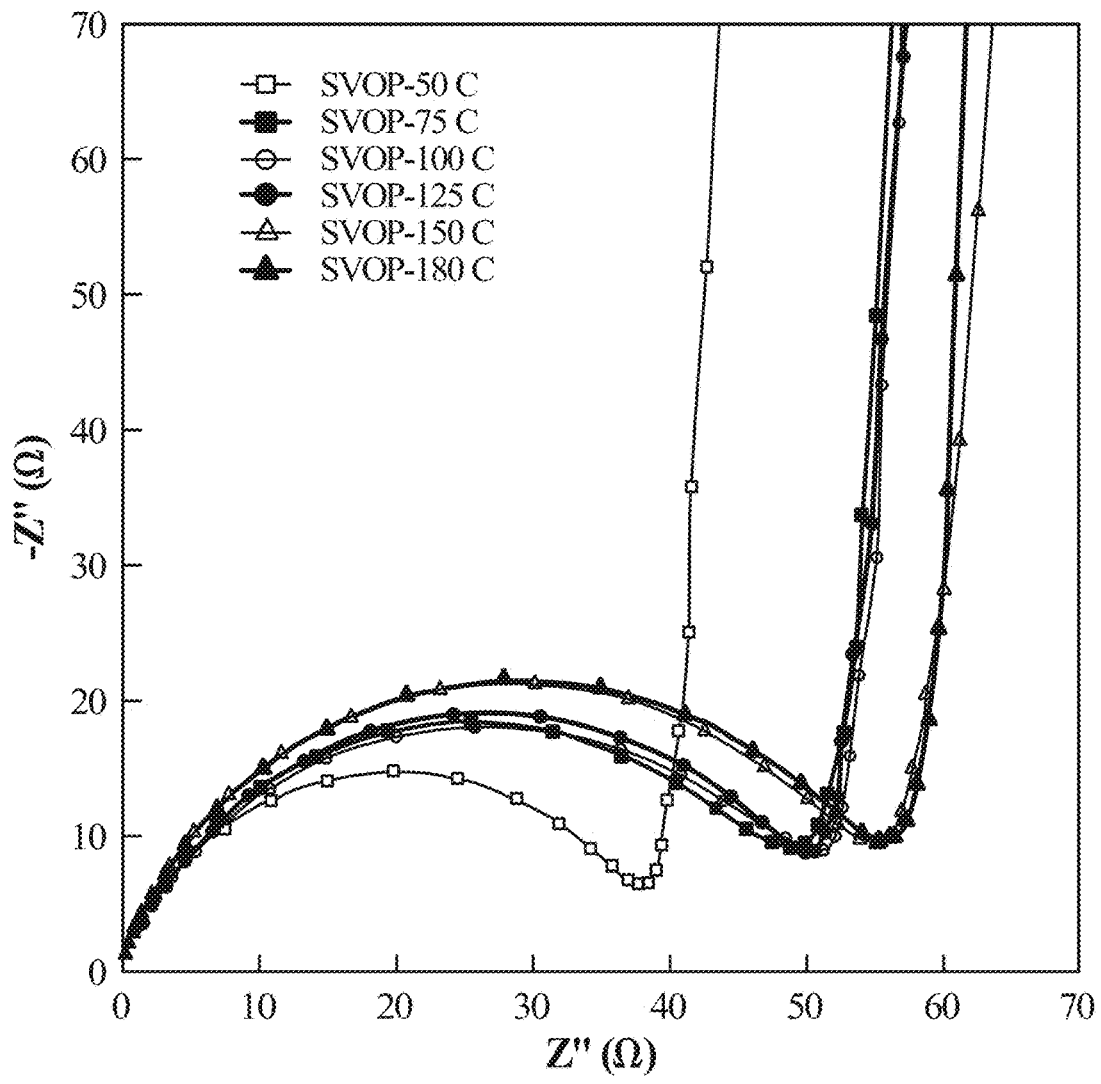
FIG. 17 is a chart that shows Nyquist plots of as-prepared materials before testing.
Figure 18:
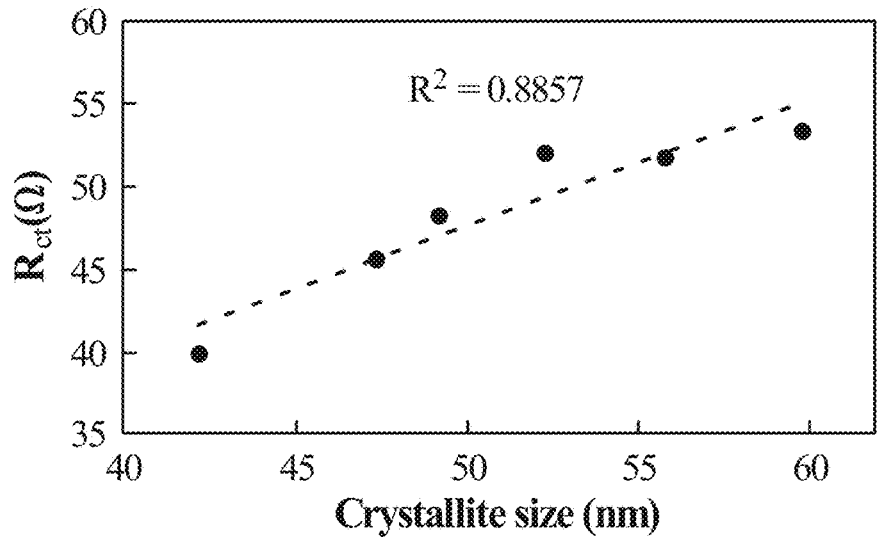
FIG. 18 is a plot that shows the relationship between resistance and crystallite size along the c-axis.

In order to assess the fade under lower depth-of-discharge cycling, a narrower voltage window (2.65 V to 3.80 V) was utilized for a second discharge/charge test. The magnitude of fade was similar under this test to the cycling under a wider voltage window. The discharge capacity in the first cycle was about 2.3 electron equivalents, while it decreased to 1.2 electron equivalents in the second cycle, implying the partial reversibility of this material is from the vanadium site. Analysis of Charged $Ag_2VO_2PO_4$ The cathodes recovered from charged cells were characterized by XRD. The XRD patterns of recharged SVOP-50 cathode are compared with SVOP-50 powder and SVOP-50 cathode before electrochemical measurement in FIG. 15. SVOP-50 cathode maintains all the peaks of the powder sample with little change in the peak position and intensity. In the charged sample, the peaks of metallic Ag can still be observed after oxidation, indicating that not all Ag is reversibly reinserted into the host material. In addition, the charged sample indicates that the materials after oxidation become amorphous without showing most of the major peaks of $Ag_2VO_2PO_4$. Without wishing to be bound by theory, this indicates that small $Li^+$ is not able to support a layered structure of SVOP after the replacement of $Ag^+$ with $Li^+$, resulting in the collapse of layers and low crystallinity.
Resistance Change in $Ag_2VO_2PO_4$ as a Function of Discharge AC impedance was measured for cells with SVOP materials before the discharge/charge test was conducted. A simple equivalent circuit consisting of a resistor ($R_s$), a parallel combination of a resistor ($R_{ct}$) and a constant phase element (CPE), and a Warburg element (open, $W_o$) was used to fit the impedance data. The equivalent circuit is shown in FIG. 16. All the Nyquist plots of as-prepared materials showed a similar characteristic with a semicircle followed by a straight line, as shown in FIG. 17. Different diameters of semicircles can be observed, suggesting a correlation between crystallite size and resistance. Therefore, resistance of semicircle vs crystallite size along the c-axis is plotted to investigate the effect of crystallite size on cell resistance, seen in FIG. 18. The sample with the lowest crystallite size shows a charge transfer resistance value of 39.9Ω, and resistance increases with crystallite size following a linear trend. This result demonstrates small crystallite size facilitates charge transfer and the movement of guest ions.

Figure 19:
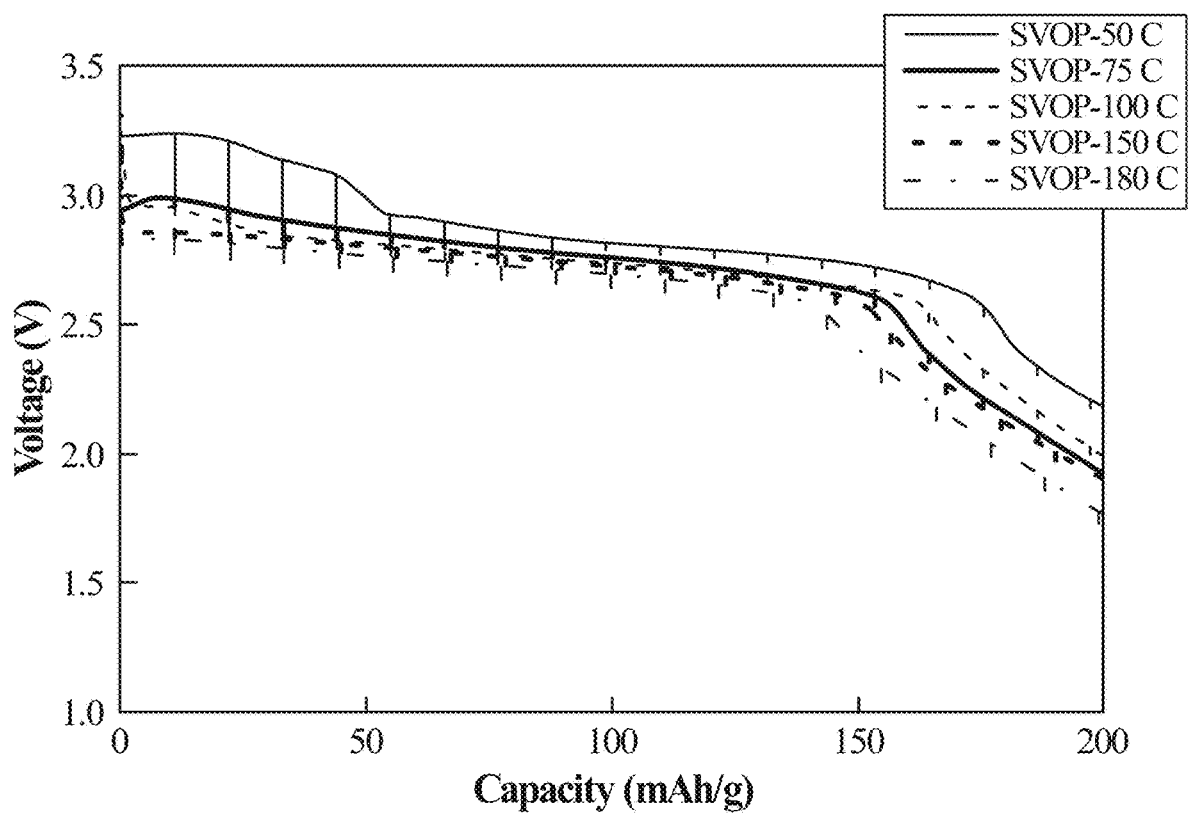
FIG. 19 is a plot that shows the results of a test in which cells were discharged with intermittent pulses at a current density of 36 mA/g.
Figure 23A:
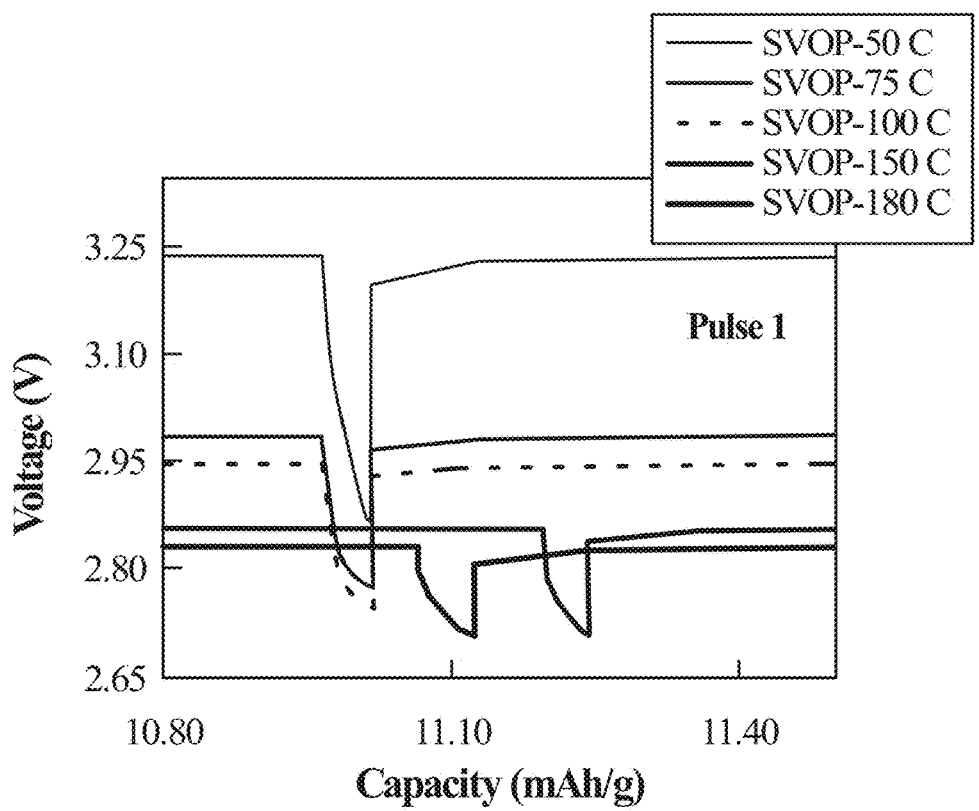
FIGS. 23A and 23B are plots that show the results of a test in which cells were discharged with intermittent pulses at a current density of 36 mA/g for the first and fourth pulses, respectively.
Figure 23B:
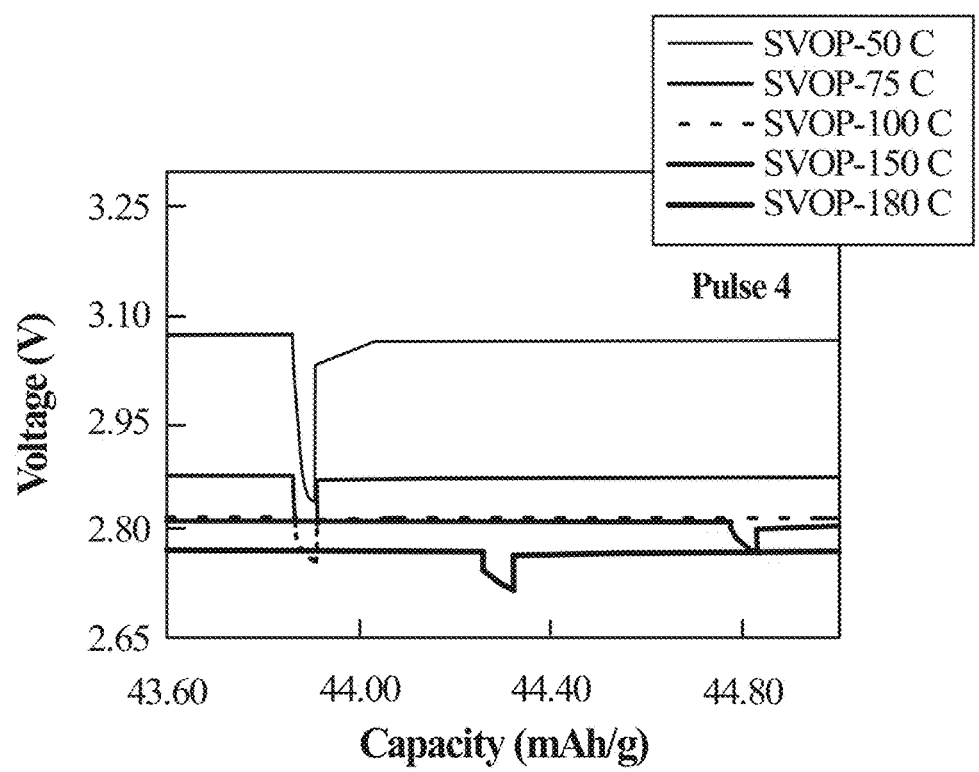

In order to further investigate the current capability of microwave-synthesized materials, test cells were discharged with intermittent pulses at a current density of 36 mA/g; the results are shown in FIG. 19. The discharge profiles are similar to that of a constant discharge test for these samples, and the capacity can be delivered to ~200 mAh/g when the voltage reaches 2.0 V. During the discharge process, initial pulses show larger voltage drops than the middle and the end of pulses. FIGS. 23A and 23B are plots that show the results for the first and fourth pulses, respectively, on an expanded capacity scale. Such a difference may be due to the formation of Ag nanoparticles in the initial discharge stage. The in situ formed conductive Ag metal could dramatically increase the conductivity and contribute to the power performance of $Ag_2VO_2PO_4$ cathodes in lithium-based batteries. However, the samples with small crystallite size have a larger voltage drop than large crystallite size samples in the initial pulses, indicating larger resistance in those cells. Therefore, resistance as a function of electron equivalents is plotted in FIG. 20 to probe the difference of cell resistance and its change during discharge. Resistance at each pulse was calculated based on the point of maximum voltage drop and Ohm's law. SVOP-180 (SVOP-180 C) shows a rapid resistance drop after discharge, and the resistance becomes stable when ~0.8 electron equivalents are transferred. In contrast, for SVOP-50 (SVOP-50 C), the resistance exhibits an apparent decrease in the initial state of discharge, keeps a slow decrease rate from 0.2 electron equivalents to 0.7 electron equivalents, and finally reaches a stable value when ~1.45 electron equivalents are utilized. Moreover, the resistance decreases faster when the crystallite size of cathode materials increases. More grain boundaries in small crystallite size materials may have an influence on the formation of conductive network because more metallic silver in the grain boundaries would be required to connect each crystallite with others.

Figure 20:
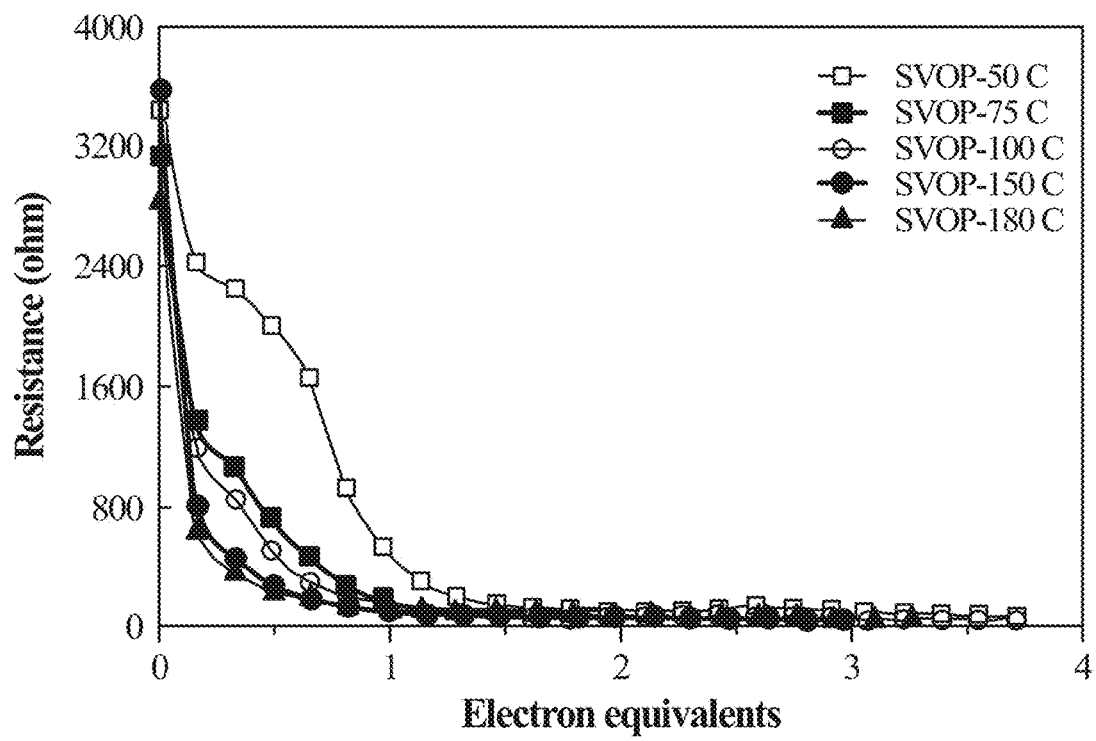
FIG. 20 is a plot that shows resistance as a function of electron equivalents.
Figure 21:
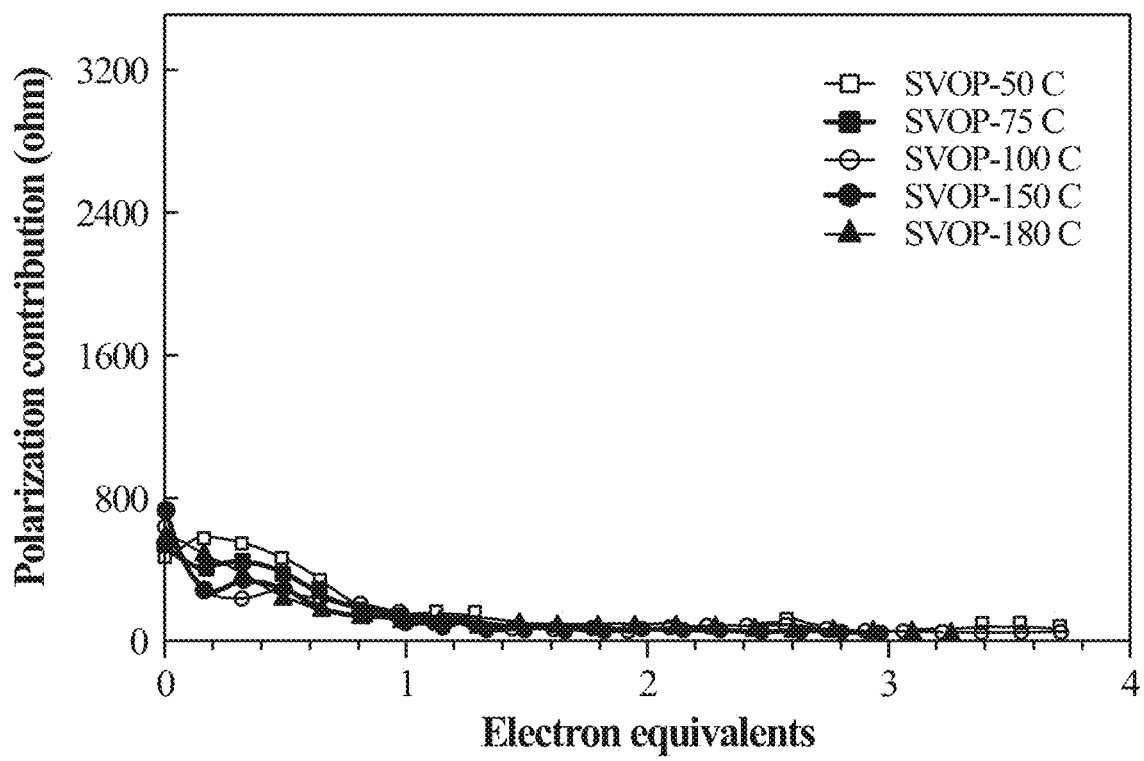
FIG. 21 is a plot that shows the polarization contribution to cell resistance from 36 mA/g pulse waveforms.
Figure 22:
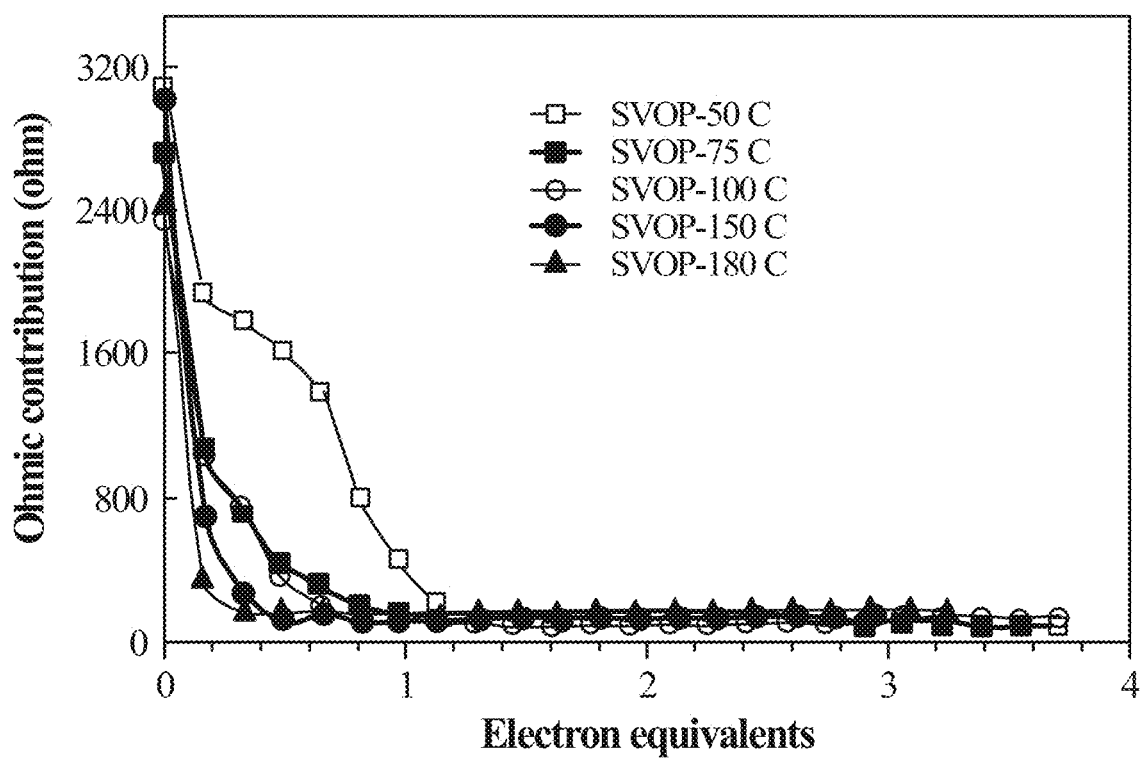
FIG. 22 is a plot that shows the ohmic contribution to cell resistance from 36 mA/g pulse waveforms.

In order to probe the phenomenon further, the ohmic and polarization contributions from the pulse waveforms were determined, as seen in FIGS. 22 and 21, respectively. Ohmic resistance was calculated based on the prominent initial voltage drop of a single pulse, and polarization resistance was calculated from the remaining voltage drop. The resistance contributions due to polarization were fairly consistent among all the sample cells, as seen in FIG. 21. In contrast, the ohmic contributions to resistance were highly dependent on the synthesis temperature of the SVOP where the SVOP-50 material shows higher resistance up to 1.0 electron equivalents of discharge (see FIG. 22). The ohmic contribution to the overall resistance more closely reflects the total resistance as shown in FIG. 20. This can be rationalized as follows. Prior to the discharge of the SVOP, the cell resistance is high and grain boundaries of the SVOP can be regarded as a contribution to the resistance. As the cell discharges, Ag metal starts to form on the surface of $Ag_2VO_2PO_4$ crystallites, with accompanying resistance drop due to the formation of conductive material. Preferred conversion of $Ag^+$ to $Ag^0$ during the initial electrochemical reduction process has been noted previously for $Ag_2VO_2PO_4$ (A. C. Marschilok 2009; E. S. Takeuchi 2009). The material samples with small crystallites have a higher number of grain boundaries compared to the larger crystallite samples. Thus, the resistance values for the SVOP-50-containing cells may remain high over a larger range of electron equivalents until sufficient Ag forms in the grain boundaries to reduce the overall ohmic resistance. Once a conductive network is established, formation of more silver nanoparticles will have little effect on resistance decrease consistent with the low resistance for all samples beyond 1.45 electron equivalents.

Pure $Ag_2VO_2PO_4$ was readily prepared by a new microwave synthesis method. Notably, the crystallite size of the samples was successfully controlled and showed a linear relationship with reaction temperature. Electrochemical measurements under galvanostatic discharge indicate that smaller crystallite size provided higher operating voltage and larger initial discharge capacity. In addition, the $Ag_2VO_2PO_4$ samples show some degree of reversibility for $Li^+$ insertion/extraction. The delivered capacity showed a dramatic fade within the first 10 cycles until a limited reversibility at a level equal to ~0.3 electron equivalents was reached. Notably, the $Ag_2VO_2PO_4$ materials with small crystallite size showed better cycle stability. Investigation of the pulse behavior showed that under galvanostatic pulses, the ohmic contribution to the voltage drop was larger for the small crystallite size materials. This is consistent with higher numbers of grain boundaries for the smaller crystallite size samples, assuming the grain boundaries contribute to the ohmic resistance. These Examples illustrate that control and variation of the physical properties of materials can significantly impact electrochemical properties and can lend insight into the structure/function complexity associated with battery discharge/charge processes. Specifically, synthetic control of materials' crystallite size presents the opportunity to directly study electrochemical properties of materials such as cycle life and voltage drop and to indirectly affect properties such as usable capacity and power.

While the above is a description of what are presently believed to be the preferred embodiments of the invention, various alternatives, modifications, and equivalents may be used. For example, the mixing conditions (stirred or unstirred), mixing intensity (stir rate), reaction times, and temperatures for the synthesis may be varied depending on the crystallite size and reaction speed desired. Those skilled in the art will realize that other and farther embodiments can be made without departing from the spirit of the invention, and it is intended to include all such further modifications and changes as come within the true scope of the following claims. Therefore, the above description should not be taken as limiting the scope of the invention, which is defined solely by the claims.

We claim:

1. A method of controlling an average crystallite size of a composition comprising silver vanadium phosphorus oxide, the method comprising:
   selection a reaction temperature and a reaction time;
   heating a mixture of vanadium oxide ($V_2O_5$), silver oxide ($Ag_2O$), phosphoric acid ($H_3PO_4$), and water using microwave energy to the reaction temperature;
   holding the mixture at the reaction temperature under microwave irradiation for the reaction time to form the silver vanadium phosphorus oxide composition; and
   cooling the silver vanadium phosphorus oxide composition to room temperature, such that the average crystallite size of the silver vanadium phosphorus oxide composition is attained, wherein the average crystallite size of the silver vanadium phosphorus oxide composition is less than about 100 nm, and wherein the silver vanadium phosphorus oxide composition has a surface area of from 5.7 $m^2/g$ to 7.5 $m^2/g$, and an atomic ratio of silver to vanadium between 1.96 and 2.

2. The method of claim 1, wherein: the reaction temperature is between 50° C. and 180° C.

3. The method of claim 1, wherein:
   the attained average crystallite size of the silver vanadium phosphorous oxide is between 42 nm and 60 nm.

4. The method of claim 3, wherein the attained average crystallite size of the silver vanadium phosphorus oxide is 42 nm.

5. A composition comprising silver vanadium phosphorus oxide having an average crystallite size less than about 100 nm and a surface area of from 5.7 $m^2/g$ to 7.5 $m^2/g$, wherein an atomic ratio of silver to vanadium in the silver vanadium phosphorous oxide is 2.0.

6. The composition of claim 5, wherein the average crystallite size is between 42 nm and 60 nm.

7. The composition of claim 6, wherein the average crystallite size is 42 nm.

8. A composition comprising silver vanadium phosphorus oxide having an average crystallite size less than about 100 nm and a surface area of from 5.7 $m^2/g$ to 7.5 $m^2/g$, and wherein an atomic ratio of silver to vanadium in the sliver vanadium phosphorus oxide is between 1.96 and 2.04.

9. The composition of claim 8, wherein the average crystallite size is maintained between 42 nm and 60 nm, including maintaining the atomic ratio of silver to vanadium in the silver vanadium phosphorus oxide between 1.96 and 2.04.

10. The composition of claim 9, wherein the average crystallite size is maintained at 42 nm, including maintaining the atomic ratio of silver to vanadium in the silver vanadium phosphorus oxide at about 2.

11. A composition comprising silver vanadium phosphorus oxide having an average crystallite size less than about 100 nm, a surface area of from 5.7 $m^2/g$ to 7.5 $m^2/g$, and an atomic ratio of silver to vanadium between 1.96 and 2.04 prepared by a process comprising the steps of:
   combining vanadium oxide ($V_2O_5$), silver oxide ($Ag_2O$), phosphoric acid ($H_3PO_4$), and pure water ($H_2O$) at room temperature;
   heating the combined vanadium oxide ($V_2O_5$), silver oxide ($Ag_2O$), phosphoric acid ($H_3PO_4$), and pure water ($H_2O$) using microwave energy at a ramp rate to a reaction temperature;
   maintaining the heated, combined vanadium oxide ($V_2O_5$), silver oxide ($Ag_2O$), phosphoric acid ($H_3PO_4$), and pure water ($H_2O$) at the reaction temperature for a reaction time to form a silver vanadium phosphorous oxide composition; and
   cooling the silver vanadium phosphorous oxide composition to room temperature.

12. The composition of claim 11, wherein the average crystallite size is between 42 nm and 60 nm.

13. The composition of claim 12, wherein the average crystallite size is maintained at 42 nm including maintaining an atomic ratio of silver to vanadium in the silver vanadium phosphorus oxide at about 2.

* * * * *